(12) United States Patent
Rathinasamy et al.

(10) Patent No.: US 11,719,899 B2
(45) Date of Patent: Aug. 8, 2023

(54) HIGH-DENSITY CO-PACKAGED OPTICS NETWORKING SYSTEM

(71) Applicant: Dell Products L.P., Round Rock, TX (US)

(72) Inventors: Shree Rathinasamy, Round Rock, TX (US); Maunish Shah, Austin, TX (US); Mark Steven Sanders, Roanoke, VA (US); Per Henrik Fremrot, Novato, CA (US)

(73) Assignee: Dell Products L.P., Round Rock, TX (US)

( * ) Notice: Subject to any disclaimer, the term of this patent is extended or adjusted under 35 U.S.C. 154(b) by 58 days.

(21) Appl. No.: 17/538,578

(22) Filed: Nov. 30, 2021

(65) Prior Publication Data

US 2023/0064740 A1 Mar. 2, 2023

Related U.S. Application Data

(63) Continuation-in-part of application No. 17/465,647, filed on Sep. 2, 2021, now Pat. No. 11,595,145.

(51) Int. Cl.
*H04Q 11/00* (2006.01)
*G02B 6/43* (2006.01)
(Continued)

(52) U.S. Cl.
CPC .............. *G02B 6/43* (2013.01); *G02B 6/12* (2013.01); *H04B 10/03* (2013.01); *H04B 10/032* (2013.01);
(Continued)

(58) Field of Classification Search
CPC .... H04B 10/03; H04B 10/032; H04J 14/0287
See application file for complete search history.

(56) References Cited

U.S. PATENT DOCUMENTS

| 9,232,678 B2 * | 1/2016 | Bailey | H05K 7/1492 |
| 2010/0054681 A1 * | 3/2010 | Biribuze | G02B 6/4452 |
| | | | 385/135 |

(Continued)

FOREIGN PATENT DOCUMENTS

JP 2011141394 * 7/2011 ............... G02B 6/00

OTHER PUBLICATIONS

Meson Fiberoptics, "Fiber Diverters," Fiber Optics Online, 1 page, available at www.fiberopticsonline.com/doc/fiber-diverters-0001.

*Primary Examiner* — Li Liu
(74) *Attorney, Agent, or Firm* — Joseph Mencher

(57) ABSTRACT

A high-density networking system includes first networking device(s) coupled to a second networking device. The second networking device has a port row including first ports and a first subset of third ports, and second ports and a second subset of third ports that are each moveable relative to the first ports and the first subset of third ports, with the third ports coupled to the first networking device(s). The second networking device includes a switch device coupling the third ports to its processing system. The switch device in second networking device routes data from the processing system through a network via the first subset of third ports/first networking device(s), determines that data received from the processing system cannot reach the network via the first subset of third ports and, in response, routes data received from the processing system through the network via the second subset of third ports/first networking device(s).

20 Claims, 47 Drawing Sheets

(51) Int. Cl.
*G02B 6/12* (2006.01)
*H04B 10/032* (2013.01)
*H04B 10/03* (2013.01)
*H04J 14/02* (2006.01)

(52) U.S. Cl.
CPC ...... *H04J 14/0287* (2013.01); *H04Q 11/0005* (2013.01); *H04Q 2011/0007* (2013.01); *H04Q 2011/0037* (2013.01)

(56) References Cited

U.S. PATENT DOCUMENTS

| | | | | |
|---|---|---|---|---|
| 2015/0331216 | A1* | 11/2015 | Smrha | G02B 6/3897 |
| | | | | 385/135 |
| 2016/0128230 | A1* | 5/2016 | Lam | H05K 7/20727 |
| | | | | 361/679.01 |
| 2016/0191308 | A1* | 6/2016 | Berry | H04L 41/0886 |
| | | | | 709/221 |
| 2016/0191314 | A1* | 6/2016 | Russell | H04L 41/22 |
| | | | | 709/221 |
| 2021/0247580 | A1* | 8/2021 | Reagan | G02B 6/4441 |
| 2021/0345024 | A1* | 11/2021 | Leigh | H04J 14/0212 |
| 2022/0141990 | A1* | 5/2022 | Gupta | H05K 7/2039 |
| | | | | 361/709 |

\* cited by examiner

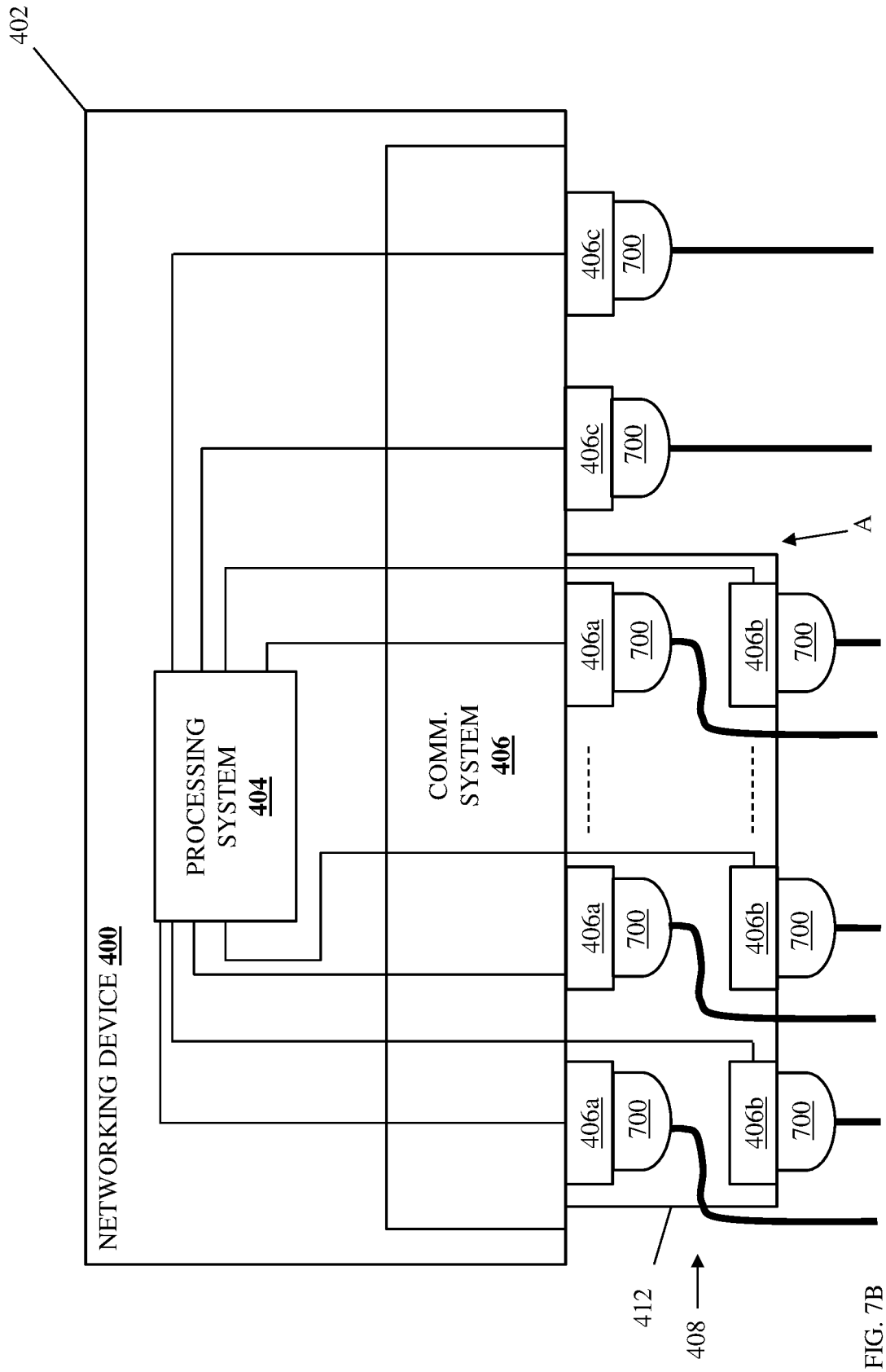

HIGH-DENSITY CO-PACKAGED OPTICS NETWORKING SYSTEM

CROSS-REFERENCE TO RELATED APPLICATIONS

The present disclosure is a continuation-in-part of U.S. patent application Ser. No. 17/465,647, filed on Sep. 2, 2021, the disclosure of which is incorporated herein by reference in its entirety.

BACKGROUND

The present disclosure relates generally to information handling systems, and more particularly to a high-density co-packaged optics networking information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may have a network interface or other input/output (I/O) interface having an optical port, including an optical interface for communication of data via an optical cable. An example of such information handling system includes a switch having multiple optical ports, each optical port configured to receive a corresponding optical cable.

Industry forecasts suggest that processors (e.g., an application-specific integrated circuit) for future generation optical switches may support 51.2-terabit/second switch capacity, meaning a co-packaged optics processor may support 1024 optical fibers using a parallel opto-electronic interface. To fully support such increase in switch capacity, switch front panels at where optical ports are accessible may require presence of significantly more optical ports than are present in existing switches. For example, while traditional implementations may use switches sized at one rack unit (RU) that have sufficient front panel area to support conventional numbers of optical ports, advances in accordance with industry forecasts described above may require the use of a significantly increased number of optical ports.

While an obvious solution may be to simply increase physical dimensions of a switch to enlarge the front panel (e.g., to two RU), such a solution has its own disadvantage of taking up additional space (e.g., in a rack), which may be undesirable in many data center environments.

Accordingly, it would be desirable to provide a high-density co-packaged optics networking system that addresses the issues discussed above.

SUMMARY

According to one embodiment, an Information Handling System (IHS) includes a chassis, a port row on the chassis including: a plurality of first ports and a first subset of a plurality of third ports that are accessible on the chassis, wherein the first subset of the plurality of third ports are coupled to at least one networking device; and a plurality of second ports and a second subset of the plurality of third ports that are accessible on the chassis and that are each moveable relative to the plurality of first ports and the first subset of a plurality of third ports, wherein the second subset of the plurality of third ports are coupled to the at least one networking device; a processing system that is housed in the chassis; and a switch device that is housed in the chassis and that couples the plurality of third ports to the processing system, wherein the switch device is configured to: route first data received from the processing system through a network via the first subset of the plurality of third ports and the at least one networking device; determine that second data received from the processing system cannot reach the network via the first subset of the plurality of third ports; and route, in response to determining that the second data received from the processing system cannot reach the network via the first subset of the plurality of third ports, the second data received from the processing system through the network via the second subset of the plurality of third ports and the at least one networking device.

BRIEF DESCRIPTION OF THE DRAWINGS

FIG. 7B is a schematic top view illustrating an embodiment of the networking device of FIGS. 4A-4E with cables coupled to its ports during the method of FIG. 6.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

Figure 1:
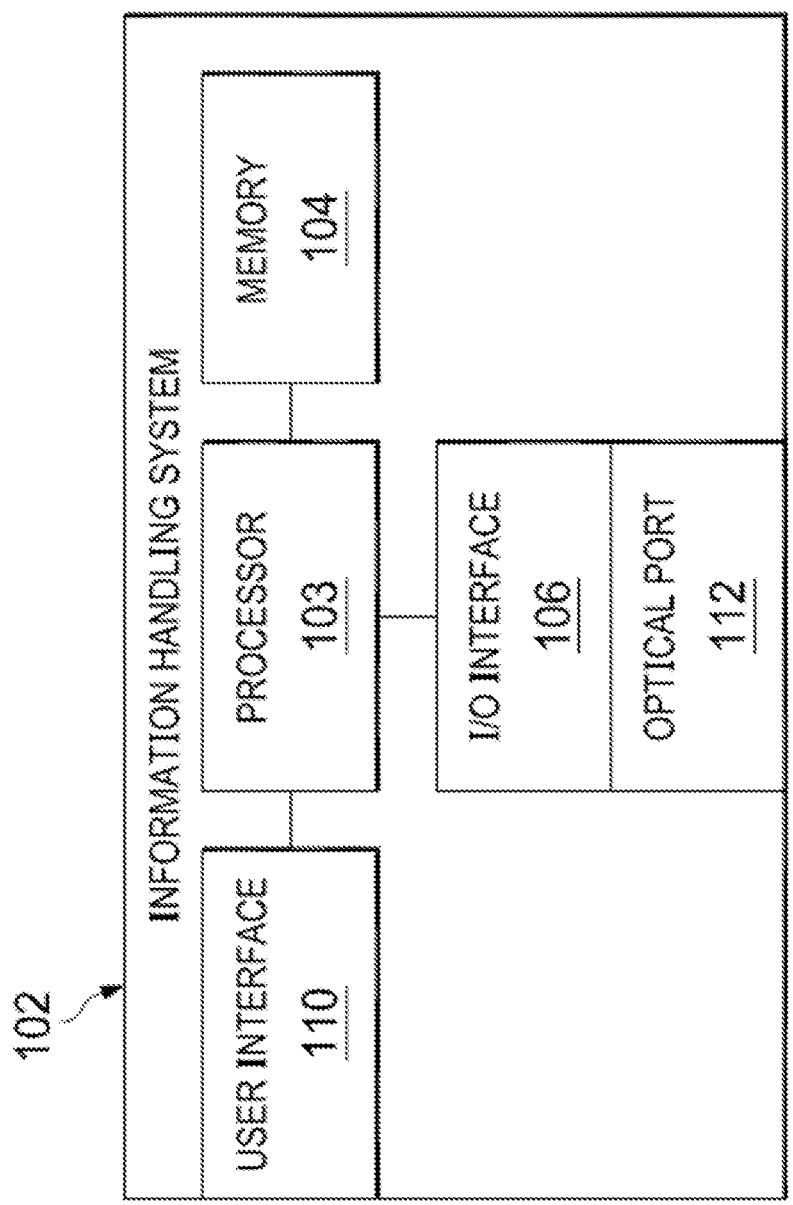
FIG. 1 illustrates a block diagram of selected components of an example information handling system, in accordance with embodiments of the present disclosure.

FIG. 1 illustrates a functional block diagram of selected components of an example information handling system 102, in accordance with embodiments of the present disclosure. In some embodiments, information handling system 102 may be a personal computer (e.g., a desktop computer or a portable computer). In other embodiments, information handling system 102 may comprise a storage server for archiving data. In yet other embodiments, information handling system 102 may comprise a server. In further embodiments, information handling system 102 may comprise a network switch.

As depicted in FIG. 1, information handling system 102 may include a processor 103, a memory 104 communicatively coupled to processor 103, an input/output interface 106 communicatively coupled to processor 103, a user interface 110 communicatively coupled to processor 103, and an optical port 112 communicatively coupled to I/O interface 106. While not provided an element number, information handling system 102 may include a chassis that houses the components of the information handling system 102, only some of which are illustrated in FIG. 1.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, and/or another component of information handling system 102.

Memory 104 may be communicatively coupled to processor 103 and may include any system, device, or apparatus configured to retain program instructions and/or data for a period of time (e.g., computer-readable media). Memory 104 may include random access memory (RAM), electrically erasable programmable read-only memory (EEPROM), a PCMCIA card, flash memory, magnetic storage, opto-magnetic storage, or any suitable selection and/or array of volatile or nonvolatile memory that retains data after power to its associated information handling system 102 is turned off.

I/O interface 106 may comprise any suitable system, apparatus, or device operable to serve as an interface between information handling system 102 and one or more other external devices. For example, in some embodiments, I/O interface 106 may comprise a network interface configured to serve as an interface between information handling system 102 and information handling systems via a network, in which case I/O interface 106 may comprise a network interface card, or "NIC."

User interface 110 may comprise any instrumentality or aggregation of instrumentalities by which a user may interact with information handling system 102. For example, user interface 110 may permit a user to input data and/or instructions into information handling system 102, and/or otherwise manipulate information handling system 102 and its associated components. User interface 110 may also permit information handling system 102 to communicate data to a user, e.g., by way of a display device.

Optical port 112 may comprise an optical interface, having an optical connector (e.g., the multi-fiber push on or "MPO" connector discussed below). Accordingly, optical port 112 may be configured to receive an optical cable (e.g., a cable including a plurality of parallel optical fibers), and thus may communicate data through the cable via its optical connector, thus communicating to a device coupled to optical port 112 via the optical cable.

Although FIG. 1 depicts information handling system 102 having only a single optical port 112, in many embodiments, especially in those in which information handling system 102 is a network switch, information handling system 102 may have a plurality of optical ports 112.

In addition to processor 103, memory 104, I/O interface 106, user interface 110, and optical port 112, information handling system 102 may include one or more other information handling resources. Such an information handling resource may include any component system, device or apparatus of an information handling system, including without limitation, a processor, bus, memory, I/O device and/or interface, storage resource (e.g., hard disk drives), network interface, electro-mechanical device (e.g., fan), display, power supply, and/or any portion thereof. An information handling resource may comprise any suitable package or form factor, including without limitation an integrated circuit package or a printed circuit board having mounted thereon one or more integrated circuits.

Figure 2A:
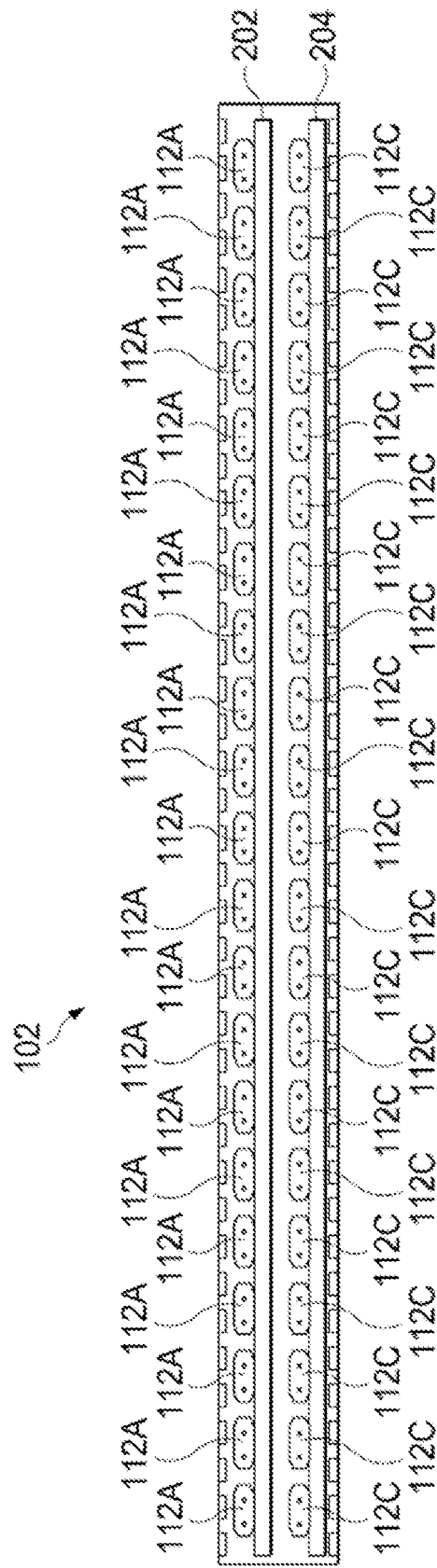
FIG. 2A illustrates an elevation view of a front panel of an example information handling system, in accordance with embodiments of the present disclosure.
Figure 2B:
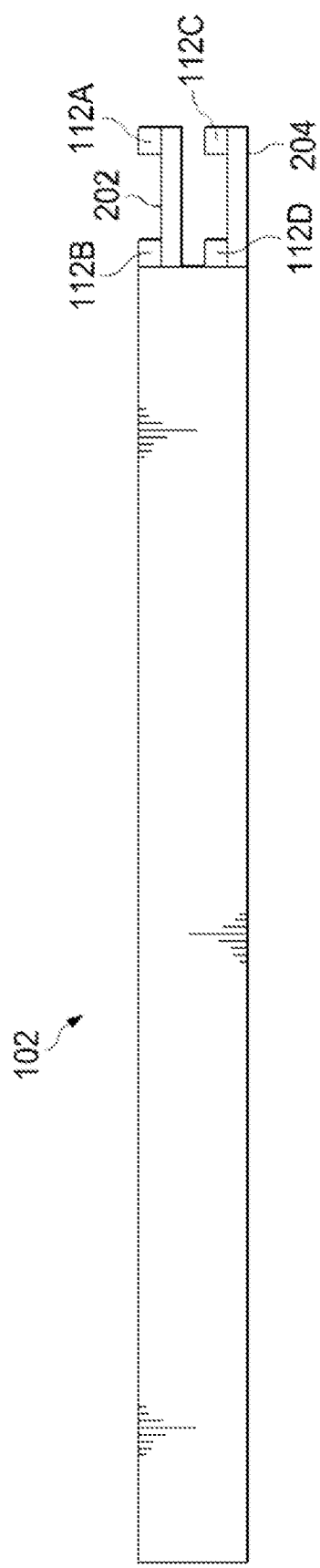
FIGS. 2B-2D illustrate elevation views of a side of the example information handling system shown in FIG. 2A, in accordance with embodiments of the present disclosure.
Figure 2C:
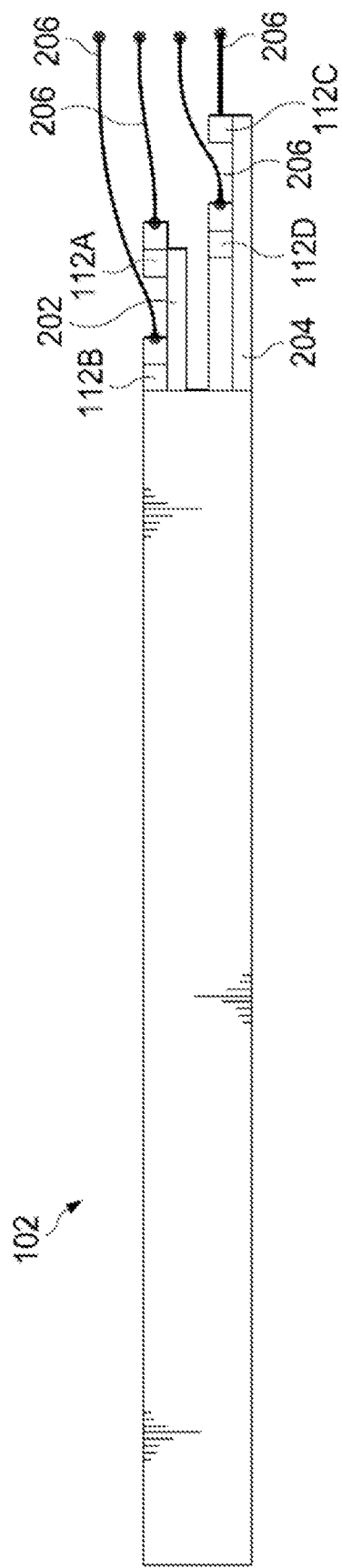
Figure 2D:
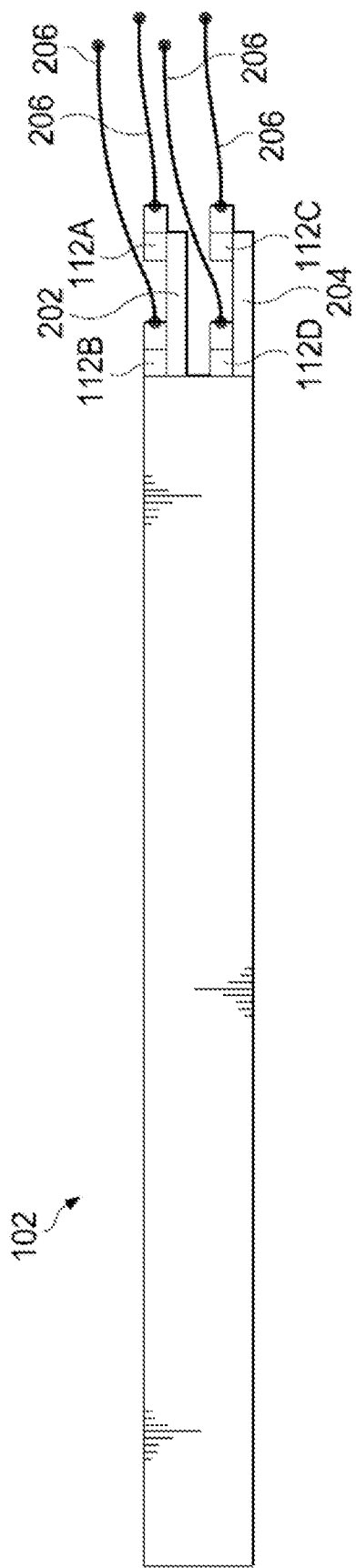

FIG. 2A illustrates an elevation view of a front panel of example information handling system 102, in accordance with embodiments of the present disclosure. In particular, FIG. 2A illustrates a front panel of an information handling system 102 implemented as a network switch. FIGS. 2B-2D illustrate elevation views of a side of example information handling system 102, in accordance with embodiments of the present disclosure.

As shown in FIGS. 2A-2D, information handling system 102 may have a plurality of optical ports 112. As described above with reference to FIG. 1, an optical port 112 may have a multi-fiber push on or "MPO" connector for receiving a corresponding MPO cable.

Further, as shown in FIGS. 2A-2D, the front panel of information handling system 102 may have a top row 202 of optical ports 112 and a bottom row 204 of optical ports 112. Top row 202 may comprise a plurality of front optical ports 112A which may be visible to a person (e.g., administrator, technician, or user) viewing the front panel head on and a plurality of rear optical ports 112B, each of which may be located directly behind front optical ports 112A (as viewed from the perspective of one viewing the front panel head on)

and which may not be visible to a person viewing the front panel head on. Likewise, bottom row 204 may comprise a plurality of front optical ports 112C which may be visible to a person (e.g., administrator, technician, or user) viewing the front panel head on and a plurality of rear optical ports 112D, each of which may be located directly behind front optical ports 112C (as viewed from the perspective of one viewing the front panel head on) and which may not be visible to a person viewing the front panel head on.

As also shown in FIGS. 2C and 2D, optical ports 112 may receive cables 206 for communicatively coupling to other devices, each which may also include its own interface for coupling to a cable 206. Each cable 206 may include one or more parallel optical fibers. In some embodiments, each cable 206 may include an MPO form factor.

As further shown in FIGS. 2C and 2D, bottom row 204 may include a housing or other structure that may be mechanically translated from an open position as shown in FIG. 2C and a closed position as shown in FIG. 2D (and vice versa) to enable a person to physically access rear optical ports 112D of bottom row 204. For example, when a person desires to couple a cable 206 to a rear optical port 112D or decouple a cable 206 from a rear optical port 112D, the person may mechanically translate bottom row 204 from the closed position to the open position. Once the person has completed servicing rear optical ports 112D, the person may mechanically translate bottom row 204 from the open position to the closed position.

To facilitate translating bottom row 204 between the closed position and open position (and vice versa), the housing of bottom row 204 may be mechanically coupled to the enclosure/chassis of information handling system 102 in a drawer-like fashion that uses rails and rollers, or any other mechanical apparatus or combination of mechanical apparatuses that allows for sliding or other translation of bottom row 204 between the closed position and open position (and vice versa).

Figure 3A:
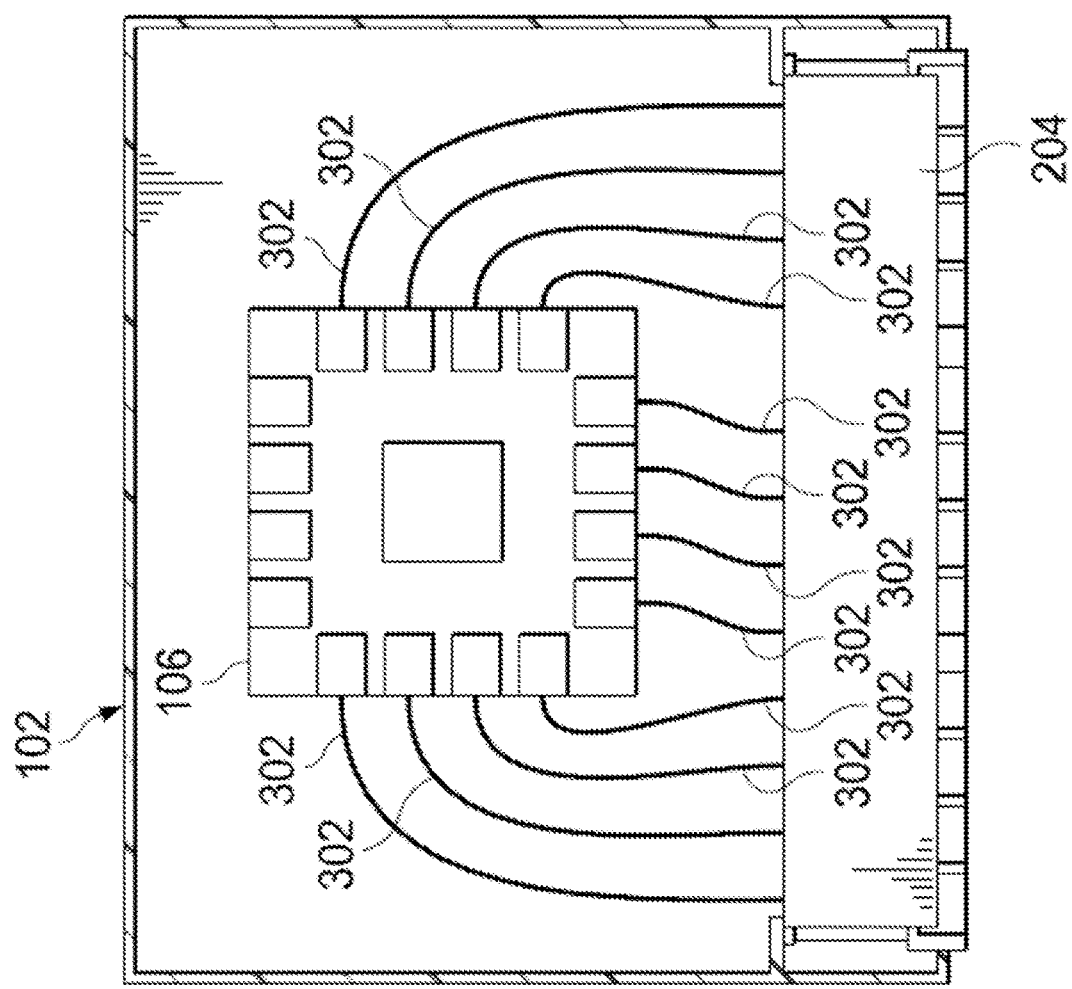
FIGS. 3A and 3B illustrate plan views of selected components of the example information system of FIG. 1, in accordance with embodiments of the present disclosure.
Figure 3B:
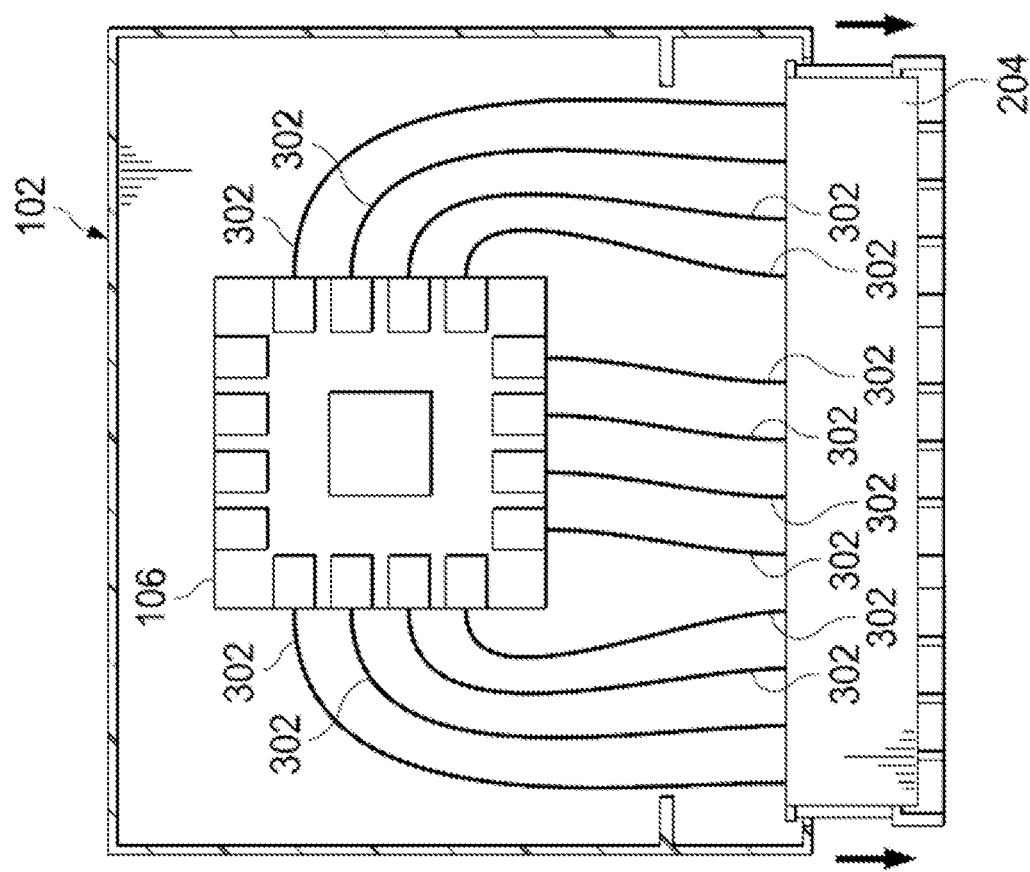
Figure 4A:
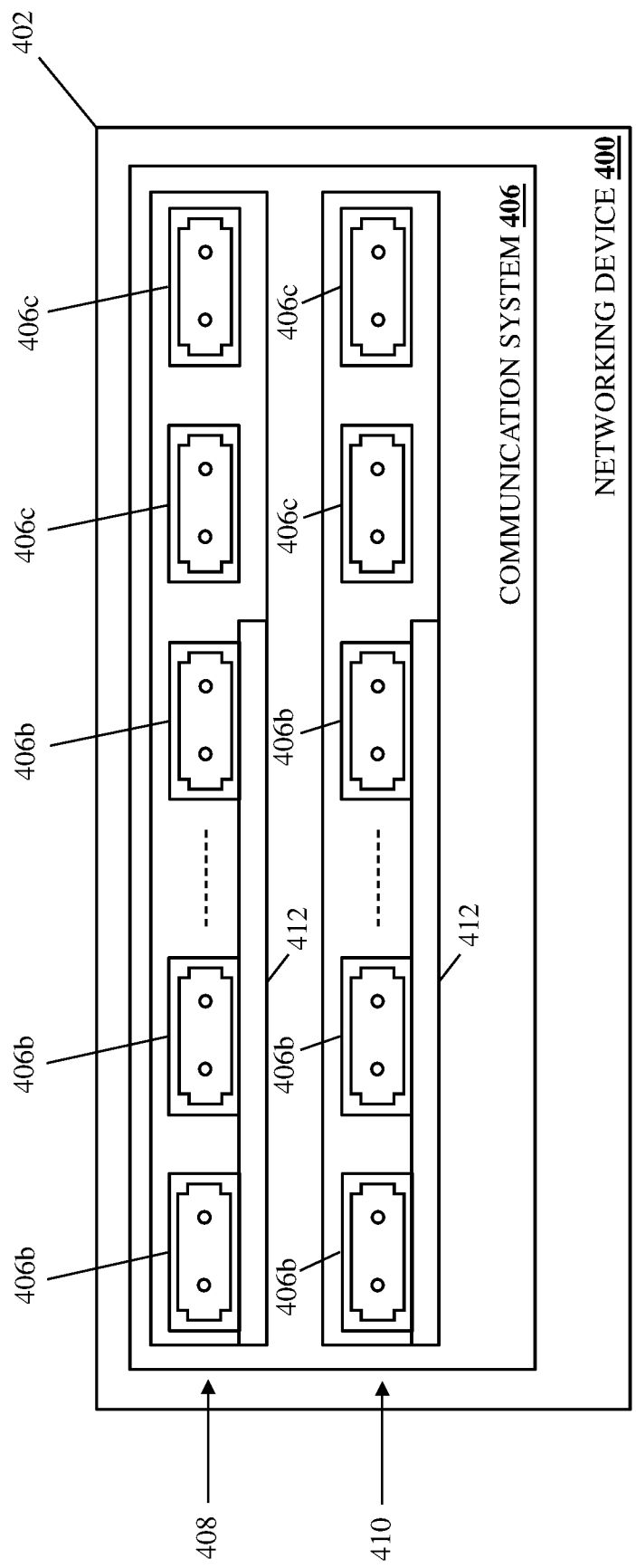
FIG. 4A is a schematic front view illustrating an embodiment of a networking device that may provide the high-density co-packaged optics networking system of the present disclosure.
Figure 4B:
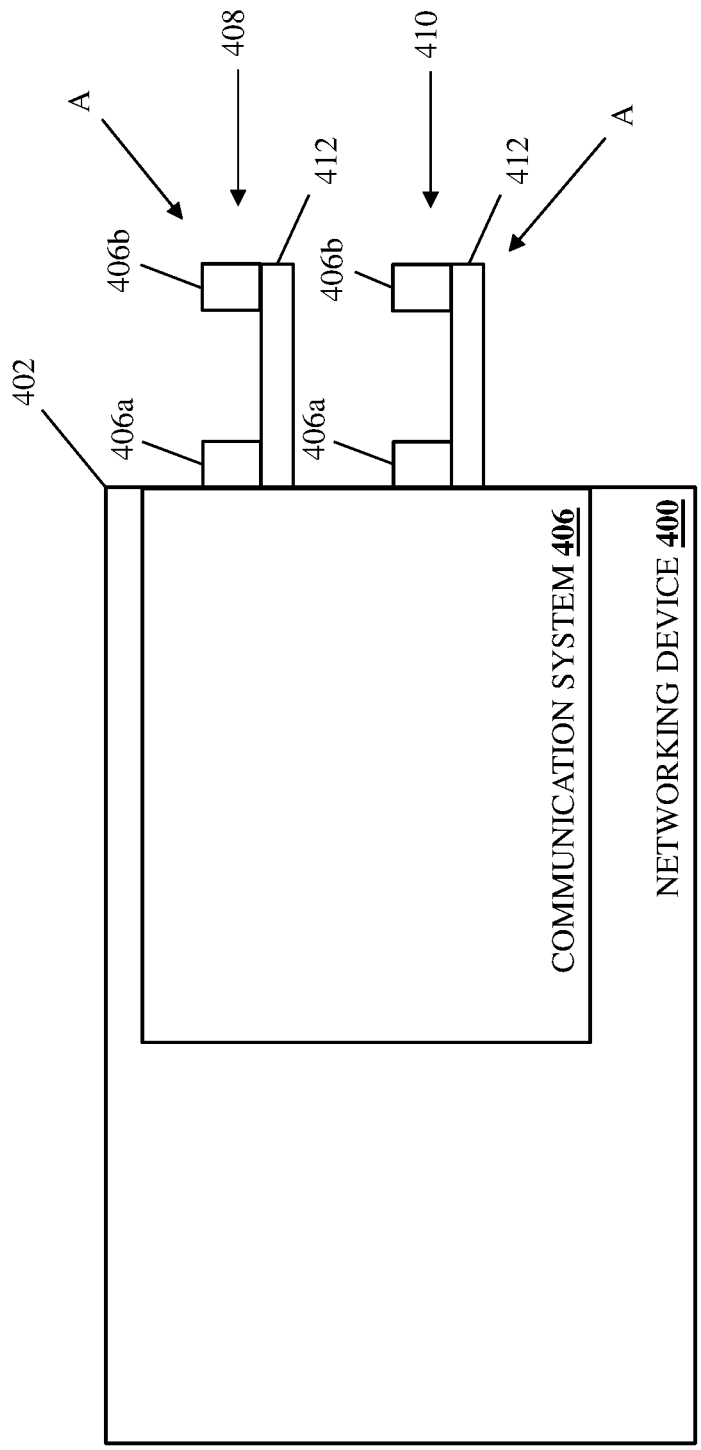
FIG. 4B is a schematic side view illustrating an embodiment of the networking device of FIG. 4A with a subset of ports in an extended orientation.
Figure 4C:
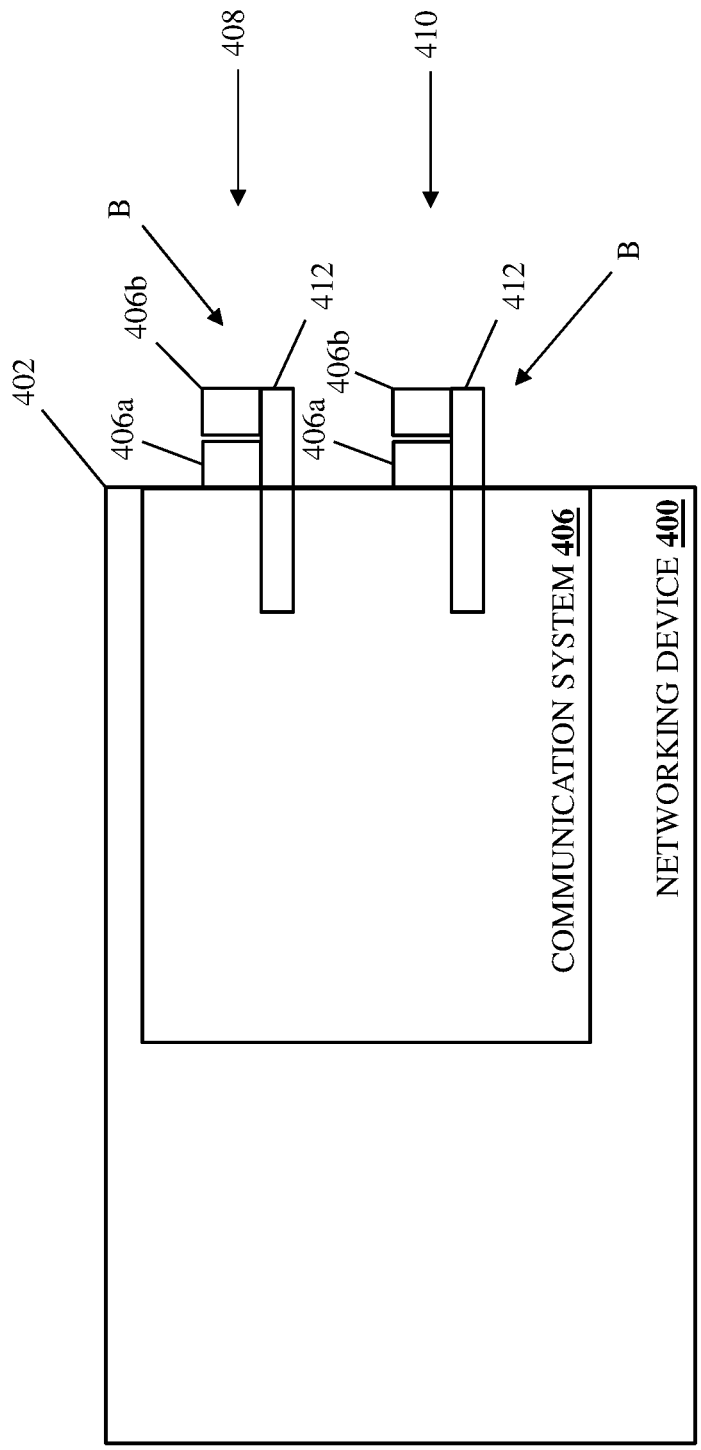
FIG. 4C is a schematic side view illustrating an embodiment of the networking device of FIG. 4A with a subset of ports in a retracted orientation.
Figure 4D:
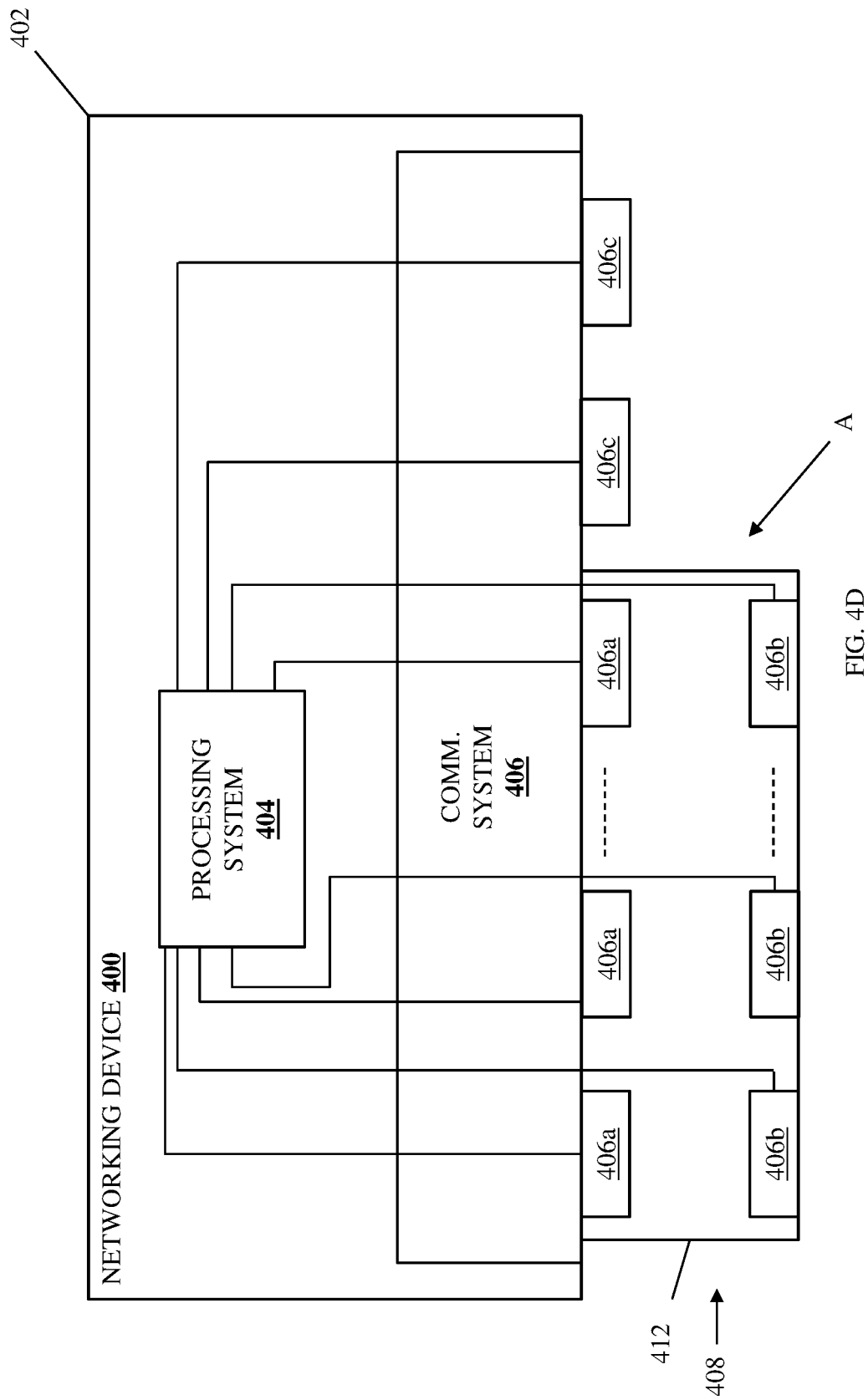
FIG. 4D is a schematic top view illustrating an embodiment of the networking device of FIG. 4A with a subset of ports in the extended orientation.
Figure 4E:
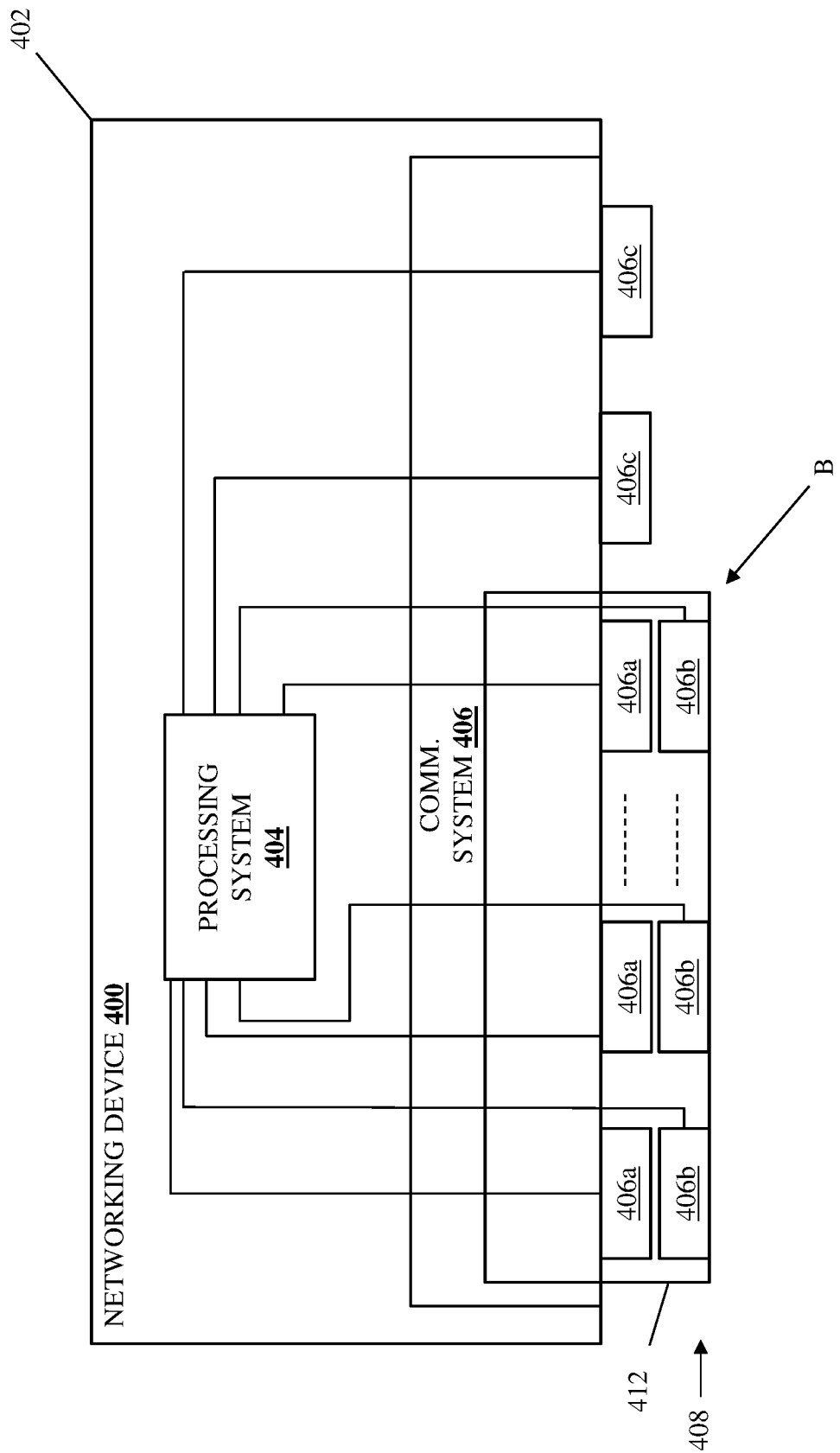
FIG. 4E is a schematic top view illustrating an embodiment of the networking device of FIG. 4A with a subset of ports in the retracted orientation.
Figure 5A:
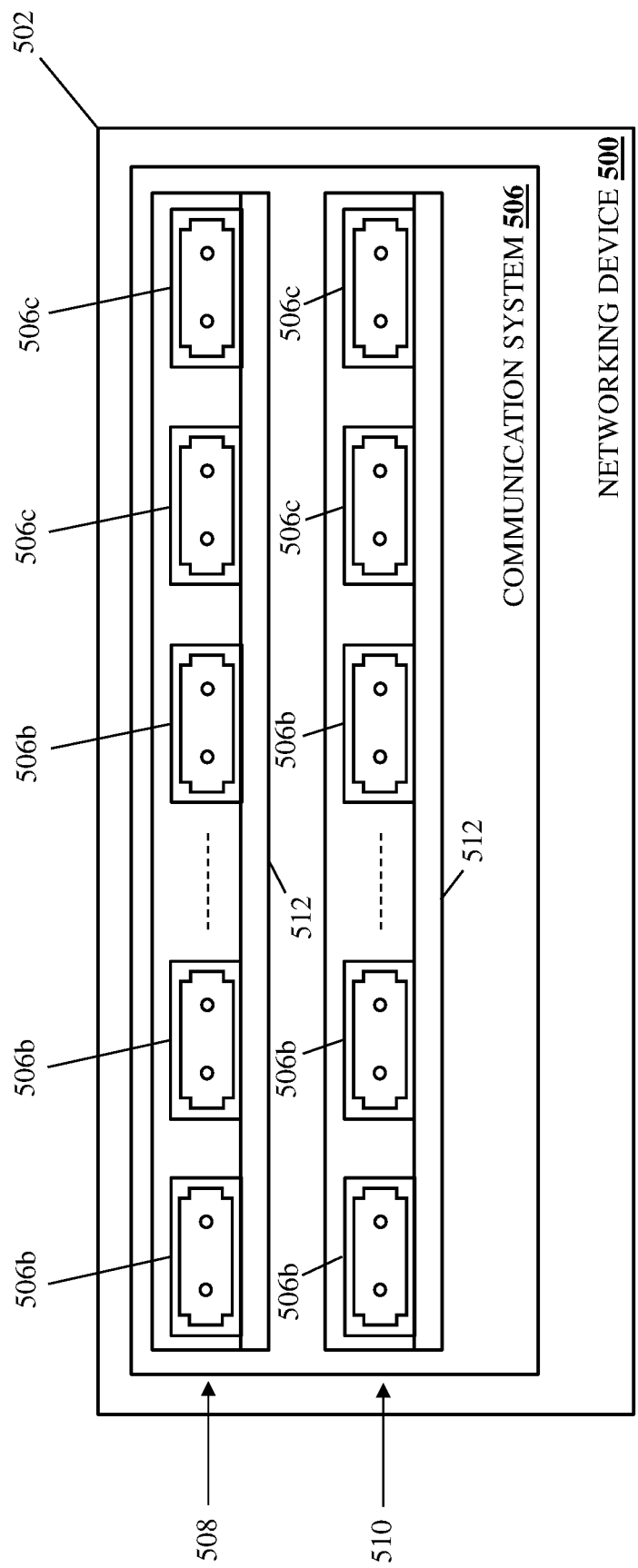
FIG. 5A is a schematic front view illustrating an embodiment of a networking device that may provide the high-density co-packaged optics networking system of the present disclosure.
Figure 5B:
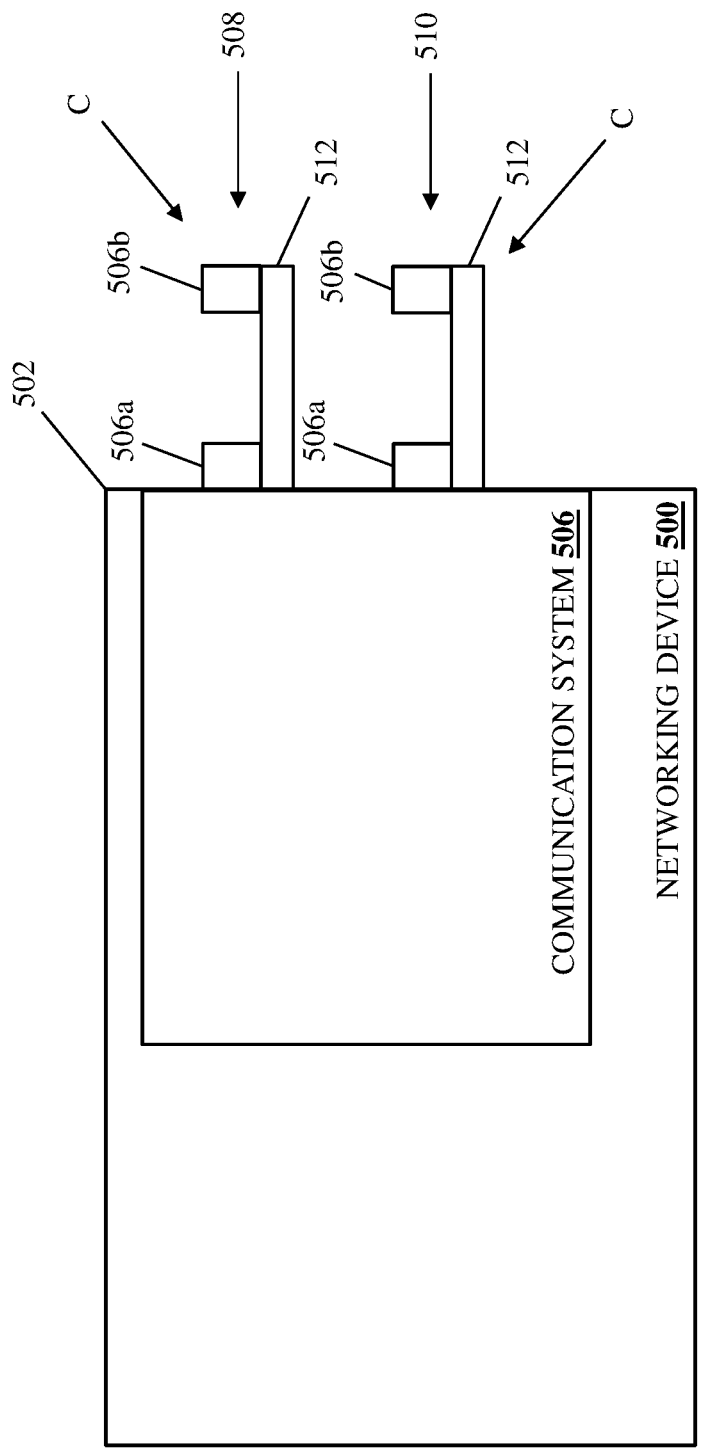
FIG. 5B is a schematic side view illustrating an embodiment of the networking device of FIG. 5A with a subset of ports in an extended orientation.
Figure 5C:
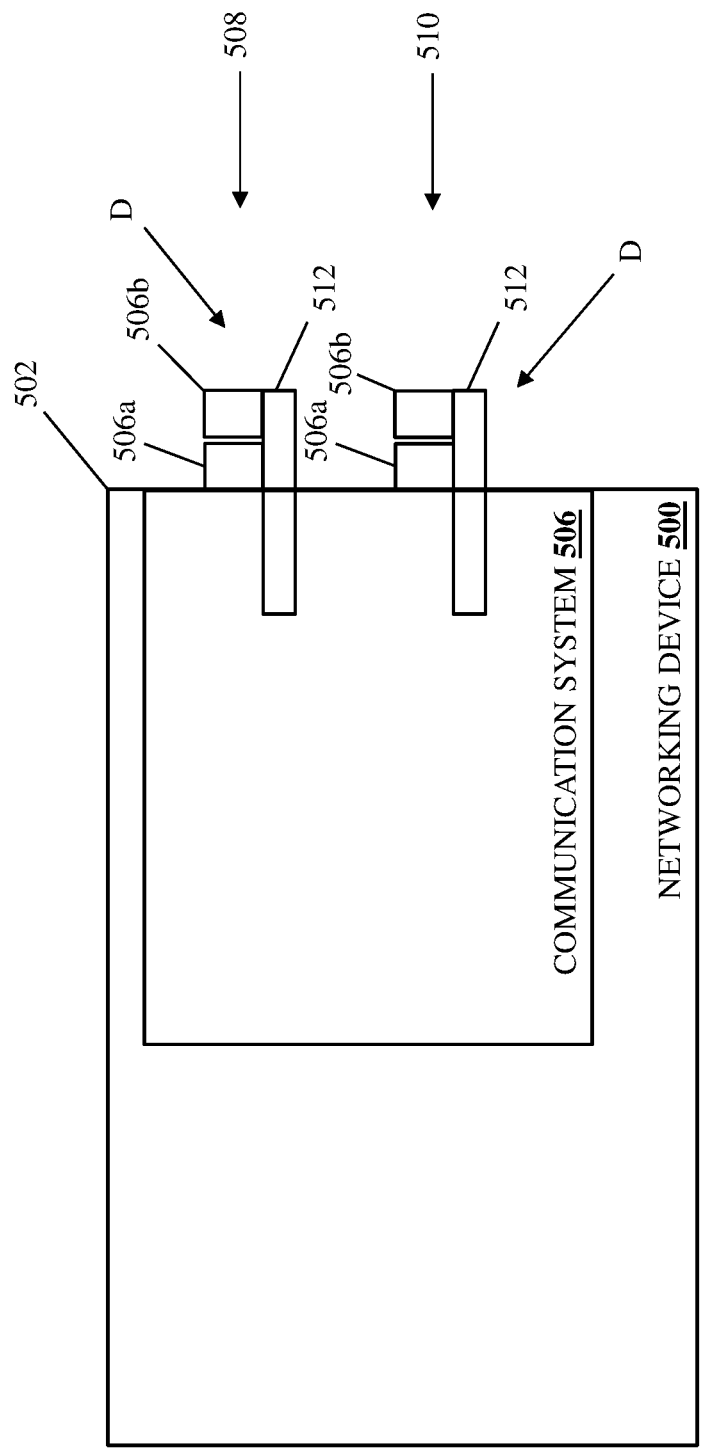
FIG. 5C is a schematic side view illustrating an embodiment of the networking device of FIG. 5A with a subset of ports in a retracted orientation.
Figure 5D:
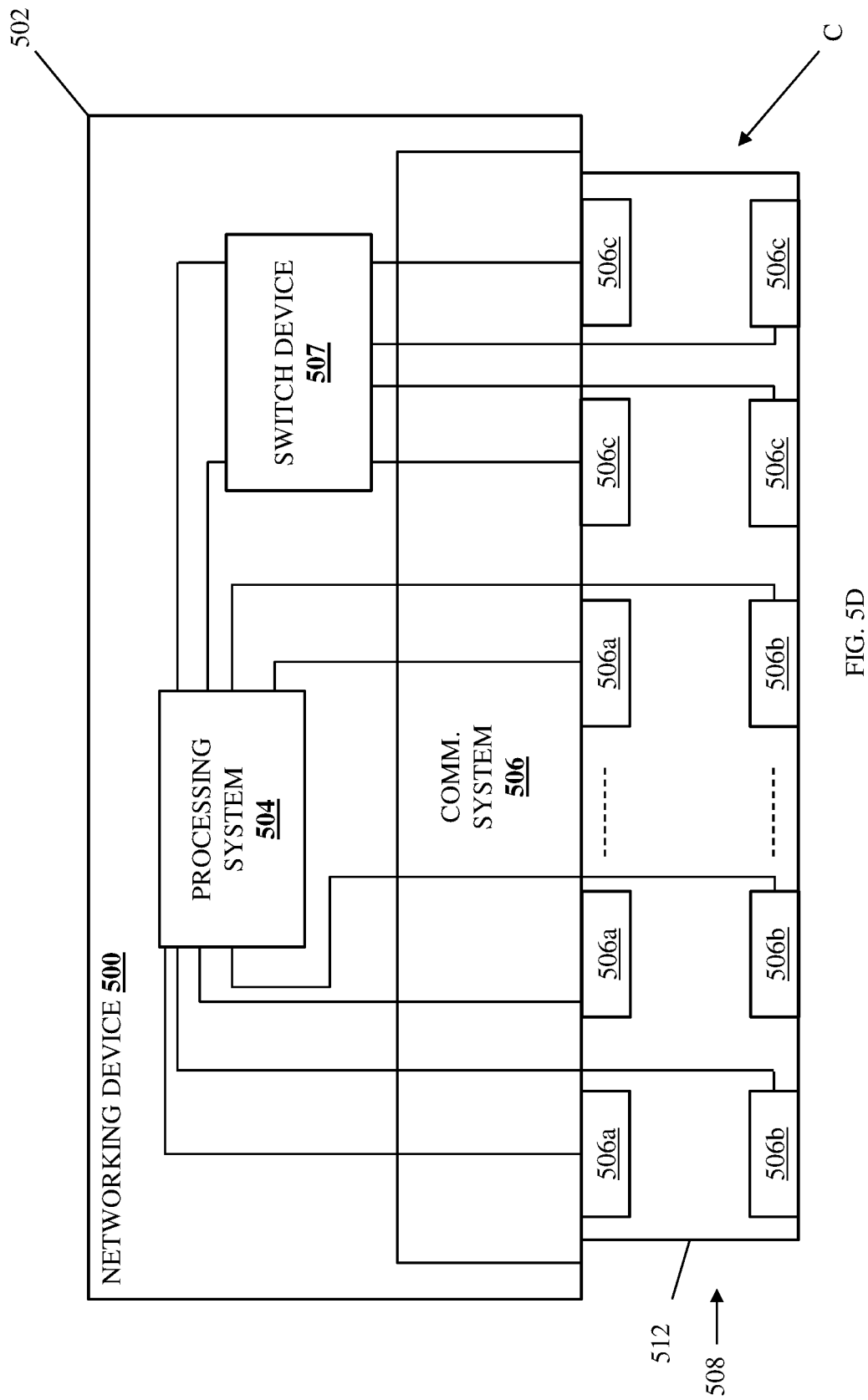
FIG. 5D is a schematic top view illustrating an embodiment of the networking device of FIG. 5A with a subset of ports in the extended orientation.
Figure 5E:
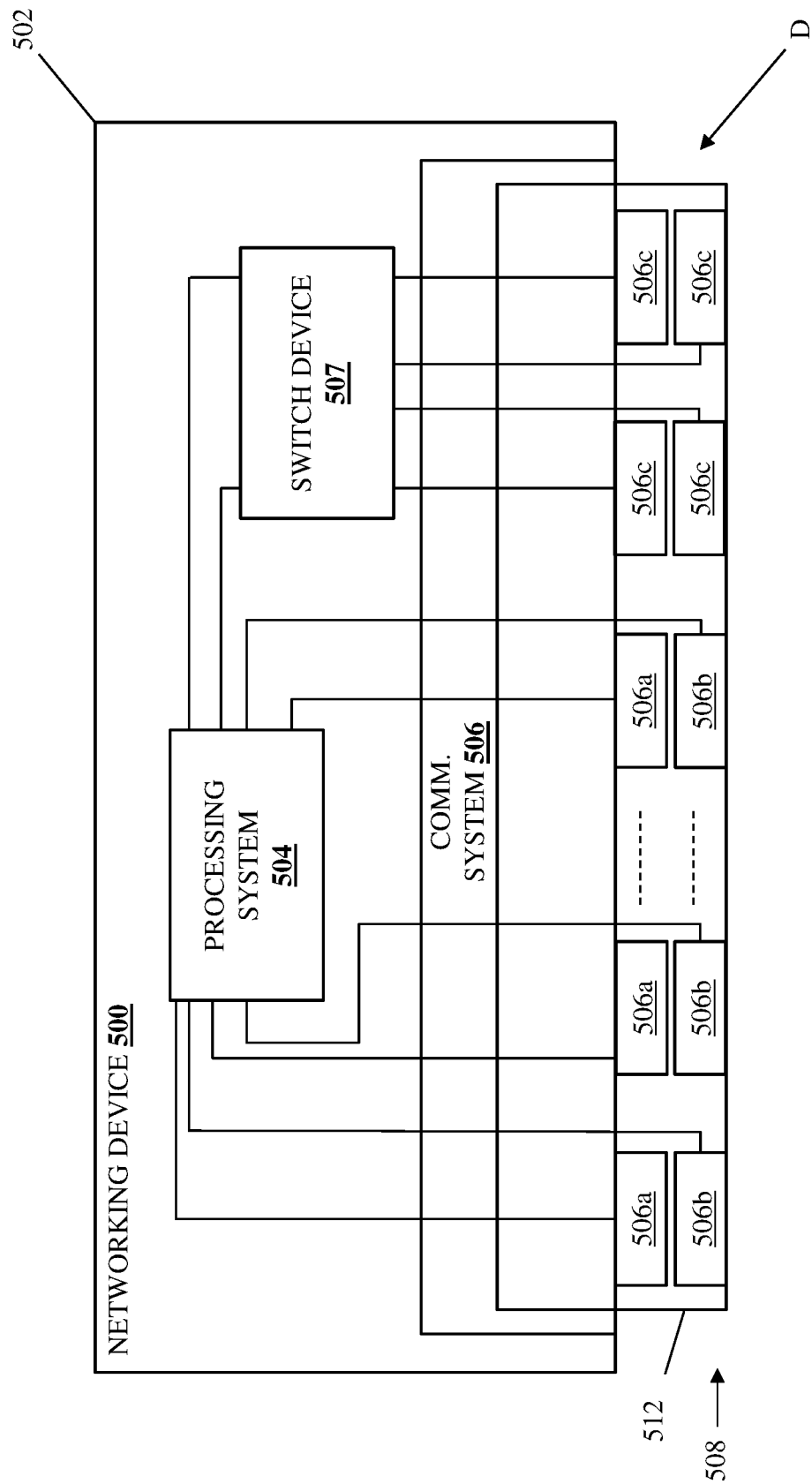
FIG. 5E is a schematic top view illustrating an embodiment of the networking device of FIG. 5A with a subset of ports in the retracted orientation.

FIGS. 3A and 3B illustrate plan views of selected components of the example information system of FIG. 1, in accordance with embodiments of the present disclosure. For purposes of clarity of exposition, top row 202 is not depicted in FIGS. 3A and 3B. As shown in FIGS. 3A and 3B, the various optical ports 112 may be communicatively coupled to optical interface 106 (e.g., a co-packaged optics switch ASIC) via a plurality of internal fiber cables 302. Lengths of such internal fiber cables 302, in particular those internal fiber cables 302 communicatively coupling optical ports 112C and optical ports 112D of bottom row 204, may have lengths to allow translation of bottom row 204 from the closed position (e.g., shown in FIG. 3A) to the open position (e.g., shown in FIG. 3B) and vice versa.

Although the foregoing contemplates that bottom row 204 may be translatable between an open position and a closed position, in some embodiments, bottom row 204 may be fixed relative to the enclosure of information handling system 102 (e.g., may be fixed in either the position shown in FIG. 2B or in the positions shown in FIG. 2C).

Referring now to FIGS. 4A, 4B, 4C, 4D, and 4E, an embodiment of a networking device 400 is illustrated that may provide the high-density co-packaged optics networking system of the present disclosure. In an embodiment, the networking device 400 may be provided by the IHS 100 discussed above with reference to FIG. 1 and/or may include some or all of the components of the IHS 100, and in specific examples discussed below is provided by a co-packaged optics switch device. However, while illustrated and discussed as being provided by a switch device utilizing particular data transmission technology, one of skill in the art in possession of the present disclosure will recognize that the functionality of the networking device 400 discussed below may be provided by other devices that are configured to operate similarly as the networking device 400 discussed below. In the illustrated embodiment, the networking device 400 includes a chassis 402 that houses the components of the networking device 400, only some of which are illustrated and described below. For example, the chassis 402 may house a processing system 404 (e.g., the processor 103 discussed above with reference to FIG. 1, which may be a Co-Packaged Optics (CPO) switch Application Specific Integrated Circuit (ASIC) in the specific examples discussed below, as well as other processing systems that would be apparent to one of skill in the art in possession of the present disclosure) and a memory system (not illustrated, but which may include the memory 114 discussed above with reference to FIG. 1) that is coupled to the processing system 404 and that includes instructions that, when executed by the processing system 404, cause the processing system to provide a networking engine (e.g., a co-packaged optics switch engine) that is configured to perform the functionality of the networking engines and/or networking devices discussed below.

The chassis 402 may also house a communication system 406 that is coupled to the processing system 404 and that may be provided wiring, cabling, circuit board(s), and/or any other communication components that would be apparent to one of skill in the art in possession of the present disclosure. In the illustrated embodiment and the specific examples discussed below, the communication system 406 includes a plurality of first ports 406a, a plurality of second ports 406b, and a plurality of third ports 406c, each of which is coupled to the processing system 404. In an embodiment, any or all of the first ports 406a, second ports 406b, and third ports 406c may be provided by optical data ports such as the Multi-fiber Push On (MPO) optical ports described herein, and/or other ports that would be apparent to one of skill in the art in possession of the present disclosure.

As can be seen in FIGS. 4A-4E, the networking device 400 includes a "top" row 408 of the first ports 406a, second ports 406b, and third ports 406c; and a "bottom" row 410 of the first ports 406a, second ports 406b, and third ports 406c. Furthermore, as discussed in further detail below, in each of the top row 408 and bottom row 410 on the networking device 400, the first ports 406a may be provided as "fixed" ports that may be mounted to the chassis 402 of the networking device 400 and that are "fixed" relative to the second ports 406b that are provided as "sliding" ports via their mounting to a support base 412 that is moveable relative to the chassis 402 between an extended orientation A illustrated in FIGS. 4B and 4D, and a retracted orientation B illustrated in FIGS. 4C and 4E. As will be appreciated by one of skill in the art in possession of the present disclosure, the retracted orientation B and the extended orientation A, as well as the spacing of adjacent first port/second port pairs (i.e., first ports and second ports that are immediately adjacent in the retracted orientation B) in the extended orientation A, may be configured to ensure a cable connector on a cable (e.g., an MPO connector on an MPO cable) may connect to each of the first ports 406a and the second ports 406b.

As such, one of skill in the art in possession of the present disclosure will appreciate how each support base 412 may be coupled to the chassis 402 of the networking device 400 by rails, sliders, and/or any of a variety of other moveable couplings that allow for the relative movement of the support base 412 and the chassis 402, and how the coupling of each of the second ports 406*b* to the processing system 404 (e.g., via cabling, wiring, etc.) may be configured to allow their relative movement between the extended orientation A and the retracted orientation B. Furthermore, while a single support base 412 for the top row 408 and a single support base 412 for the bottom row 410 are illustrated and described in the examples provided herein, one of skill in the art in possession of the present disclosure will appreciated how multiple support bases in each of the top row 408 and the bottom row 410 may be provided to support subsets of the second ports 406*b* (e.g., a support base supporting a single second port 406*b*, a support base supporting an adjacent pair of second ports 406*b*, etc.) while remaining within the scope of the present disclosure as well.

In the specific example provided by the networking device 400 illustrated in FIGS. 4A-4E and discussed in further detail below, the third ports 406*c* are designated as "uplink" ports that may be coupled via respective cables to switch devices such as the spine switch devices discussed below, while the first ports 406*a* and second ports 406*b* may be coupled to server devices and/or other devices (e.g., in a datacenter) that would be apparent to one of skill in the art in possession of the present disclosure. For example, the top row 408 of communication system 406 in the networking device 400 may include 15 first ports 406*a* designated as ports "1"-"15", 2 third ports 406*c* designated as ports "16" and "17", and 15 second ports 406*b* designated as ports "18"-"32", while the bottom row 410 of communication system 406 in the networking device 400 may include 15 first ports 406*a* designated as ports "33"-"47", 2 third ports 406*c* designated as ports "48" and "49", and 15 second ports 406*b* designated as ports "50"-"64". However, while a particular number of ports have been illustrated and described, one of skill in the art in possession of the present disclosure will appreciate that networking devices with fewer or more ports will fall within the scope of the present disclosure as well. Furthermore, one of one of skill in the art in possession of the present disclosure will also appreciate that the designation of ports on the networking device 400 as uplink ports (e.g., the ports designated as "16", "17", "48", and "49" in the example above) is relatively arbitrary, and that any of the ports in the communication system may be designated as third ports/uplink ports while remaining within the scope of the present disclosure as well.

Thus, while a specific networking device 400 has been illustrated and described, one of skill in the art in possession of the present disclosure will recognize that networking devices (or other devices operating according to the teachings of the present disclosure in a manner similar to that described below for the networking device 400) may include a variety of components and/or component configurations for providing conventional networking device functionality, as well as the functionality discussed below, while remaining within the scope of the present disclosure as well.

Referring now to FIGS. 5A, 5B, 5C, 5D, and 5E, an embodiment of a networking device 500 is illustrated that may provide the high-density co-packaged optics networking system of the present disclosure. In an embodiment, the networking device 500 may be provided by the IHS 100 discussed above with reference to FIG. 1 and/or may include some or all of the components of the IHS 100, and in specific examples discussed below is provided by a co-packaged optics switch device. However, while illustrated and discussed as being provided by a switch device utilizing particular data transmission technology, one of skill in the art in possession of the present disclosure will recognize that the functionality of the networking device 500 discussed below may be provided by other devices that are configured to operate similarly as the networking device 500 discussed below. In the illustrated embodiment, the networking device 500 includes a chassis 502 that houses the components of the networking device 500, only some of which are illustrated and described below. For example, the chassis 502 may house a processing system 504 (e.g., the processor 103 discussed above with reference to FIG. 1, which may be a CPO switch ASIC in the specific examples discussed below, as well as other processing systems that would be apparent to one of skill in the art in possession of the present disclosure) and a memory system (not illustrated, but which may include the memory 114 discussed above with reference to FIG. 1) that is coupled to the processing system 504 and that includes instructions that, when executed by the processing system 504, cause the processing system to provide a networking engine (e.g., a co-packaged optics switch engine) that is configured to perform the functionality of the networking engines and/or networking devices discussed below.

The chassis 502 may also house a communication system 506 that is coupled to the processing system 504 and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. In the illustrated embodiment and the specific examples discussed below, the communication system 506 includes a plurality of first ports 506*a* and a plurality of second ports 506*b*, each of which is coupled to the processing system 504, as well as a plurality of third ports 506*c* that are each coupled to the processing system 504 via a switch device 507 (e.g., an optical switch device in the examples below, although other switch devices utilizing other data transmission technologies will fall within the scope of the present disclosure as well). In an embodiment, any or all of the first ports 506*a*, second ports 506*b*, and third ports 506*c* may be provided by optical data ports such as the MPO optical ports described herein, and/or other ports that would be apparent to one of skill in the art in possession of the present disclosure.

As can be seen in FIGS. 5A-5E, the networking device 500 includes a "top" row 508 of the first ports 506*a*, second ports 506*b*, and third ports 506*c*; and a "bottom" row 510 of the first ports 506*a*, second ports 506*b*, and third ports 506*c*. Furthermore, as discussed in further detail below, in each of the top row 508 and bottom row 510 on the networking device 500, the first ports 506*a* and a first subset of the third ports 506*c* may be provided as "fixed" ports that may be mounted to the chassis 502 of the networking device 500 and that are "fixed" relative to the second ports 506*b* and a second subset of the third ports 506*c* that are provided as "sliding" ports via their mounting to a support base 512 that is moveable relative to the chassis 502 between an extended orientation C illustrated in FIGS. 5B and 5D, and a retracted orientation D illustrated in FIGS. 5C and 5E.

As such, one of skill in the art in possession of the present disclosure will appreciate how each support base 512 may be coupled to the chassis 502 of the networking device 500 by rails, sliders, and/or any of a variety of other moveable couplings that allow for the relative movement of the support base 512 and the chassis 502, and how the coupling of each of the second ports 406*b* to the processing system 504 (e.g., via cabling, wiring, etc.), and each of the second subset of third ports 406*c* to the switch device 507 (e.g., via cabling, wiring, etc.), may be configured to allow their relative movement between the extended orientation C and the retracted orientation D. Furthermore, while a single support base 512 for the top row 508 and a single support base 512 for the bottom row 510 are illustrated and described, one of skill in the art in possession of the present disclosure will appreciated how multiple support bases in each of the top row 508 and the bottom row 510 may be provided to support subsets of the second ports 506*b* and/or the second subset of the third ports 506*c* (e.g., a support base supporting a single second port 506*b*, a support base supporting an adjacent pair of second ports 506*b*, a support base supporting a single third port 506*c*, a support base supporting an adjacent pair of third ports 506*c*, a support base supporting an adjacent second port 506*b* and third port 506*c*, etc.) while remaining within the scope of the present disclosure as well.

In the specific example provided by the networking device 500 illustrated in FIGS. 5A-5E and discussed in further detail below, the third ports 506*c* are designated as "uplink" ports that may be coupled via respective cables to switch devices such as the spine switch devices discussed below that provide access to the Internet, while the first ports 506*a* and second ports 506*b* may be coupled to server devices and/or other devices (e.g., in a datacenter) that would be apparent to one of skill in the art in possession of the present disclosure. For example, the top row 508 of communication system 506 in the networking device 500 may include 15 first ports 506*a* designated as ports "1"-"15", 2 third ports 506*c* designated as ports "16A" and "17A", 15 second ports 506*b* designated as ports "18"-"32", and 2 third ports 506*c* designated as ports "16B" and "17B", while the bottom row 510 of communication system 506 in the networking device 500 may include 15 first ports 506*a* designated as ports "33"-"47", 2 third ports 506*c* designated as ports "48A" and "49A", 15 second ports 506*b* designated as ports "50"-"64", and 2 third ports 506*c* designated as ports "48B" and "49B". However, one of skill in the art in possession of the present disclosure will also appreciate that the designation of ports on the networking device 500 as uplink ports (e.g., the ports designated as "16A", "16B", "17A", "17B", "48A", "48B", "49A", and "49B" in the example above) is relatively arbitrary, and that any of the ports in the communication system may be designated as third ports/uplink ports while remaining within the scope of the present disclosure as well.

Thus, while a specific networking device 500 has been illustrated and described, one of skill in the art in possession of the present disclosure will recognize that networking devices (or other devices operating according to the teachings of the present disclosure in a manner similar to that described below for the networking device 500) may include a variety of components and/or component configurations for providing conventional networking device functionality, as well as the functionality discussed below, while remaining within the scope of the present disclosure as well.

Figure 6:
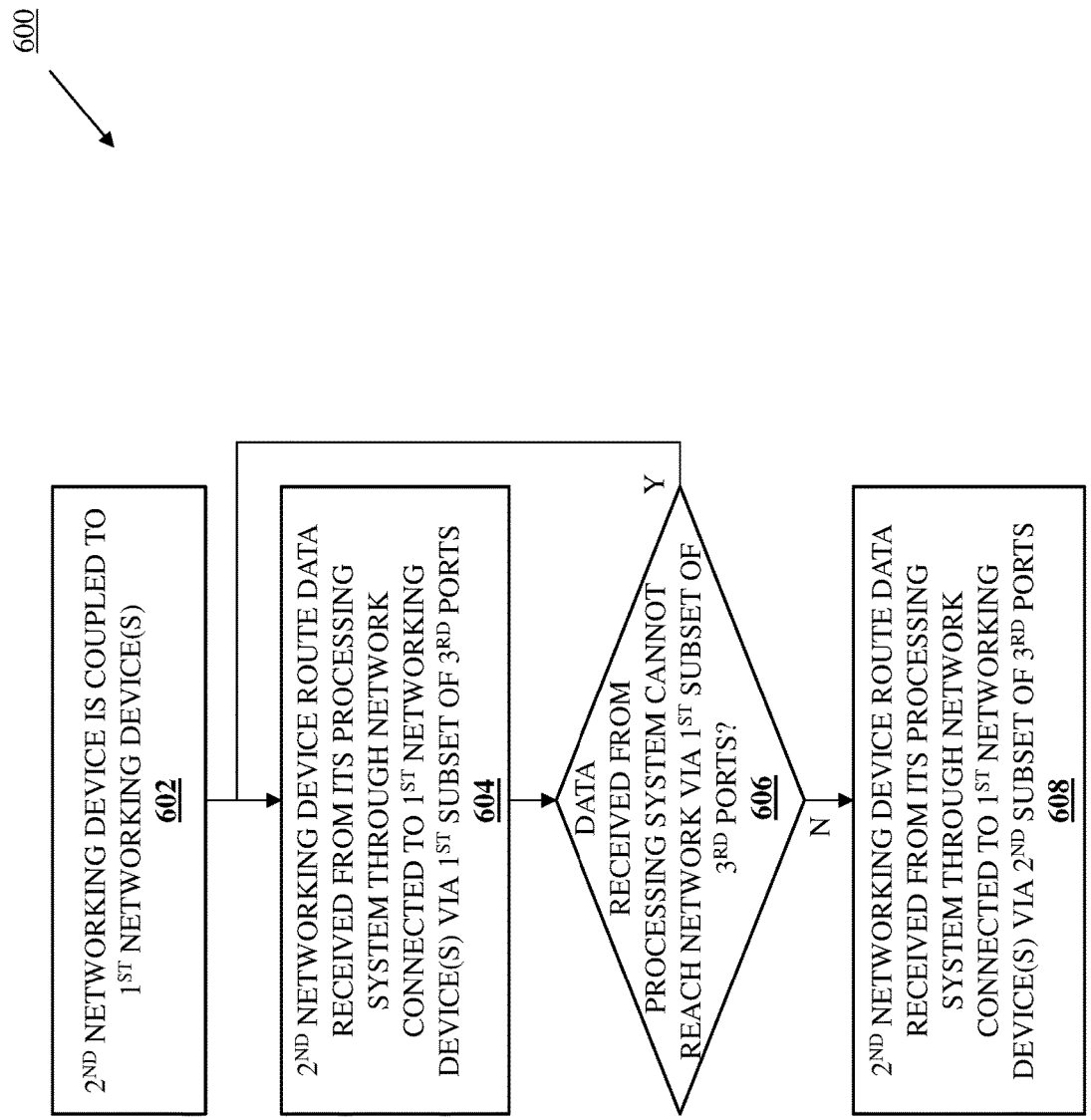
FIG. 6 is a flow chart illustrating an embodiment of a method for operating a high-density co-packaged optics networking system.

Referring now to FIG. 6, an embodiment of a method 600 for operating a high-density co-packaged optics networking system is illustrated. As discussed below, the systems and methods of the present disclosure provide for the operation of the high-density co-packaged optics networking systems of the present disclosure and, in particular, describe embodiments in which redundant uplinks are provided by a pair of fixed/moveable ports to ensure connectivity to a network. For example, the high-density networking system of the present disclosure may include first networking device(s) coupled to a second networking device. The second networking device has a port row including first ports and a first subset of third ports, and second ports and a second subset of third ports that are each moveable relative to the first ports and the first subset of third ports, with the third ports coupled to the first networking device(s). The second networking device includes a switch device coupling the third ports to its processing system. The switch device in the second networking device routes data from the processing system through a network via the first subset of third ports/first networking device(s), determines that data received from the processing system cannot reach the network via the first subset of third ports and, in response, routes data received from the processing system through the network via the second subset of third ports/first networking device(s). As such, a high-density co-packaged optics networking system may be provided with a built-in optical switch device for uplink ports that provides for high availability without the need to utilize a high speed non-uplink port in the event of an uplink link unavailability, uplink port unavailability, a uplink switch device unavailability, switch device unavailability due to maintenance, and/or other uplink issues known in the art.

Figure 7A:
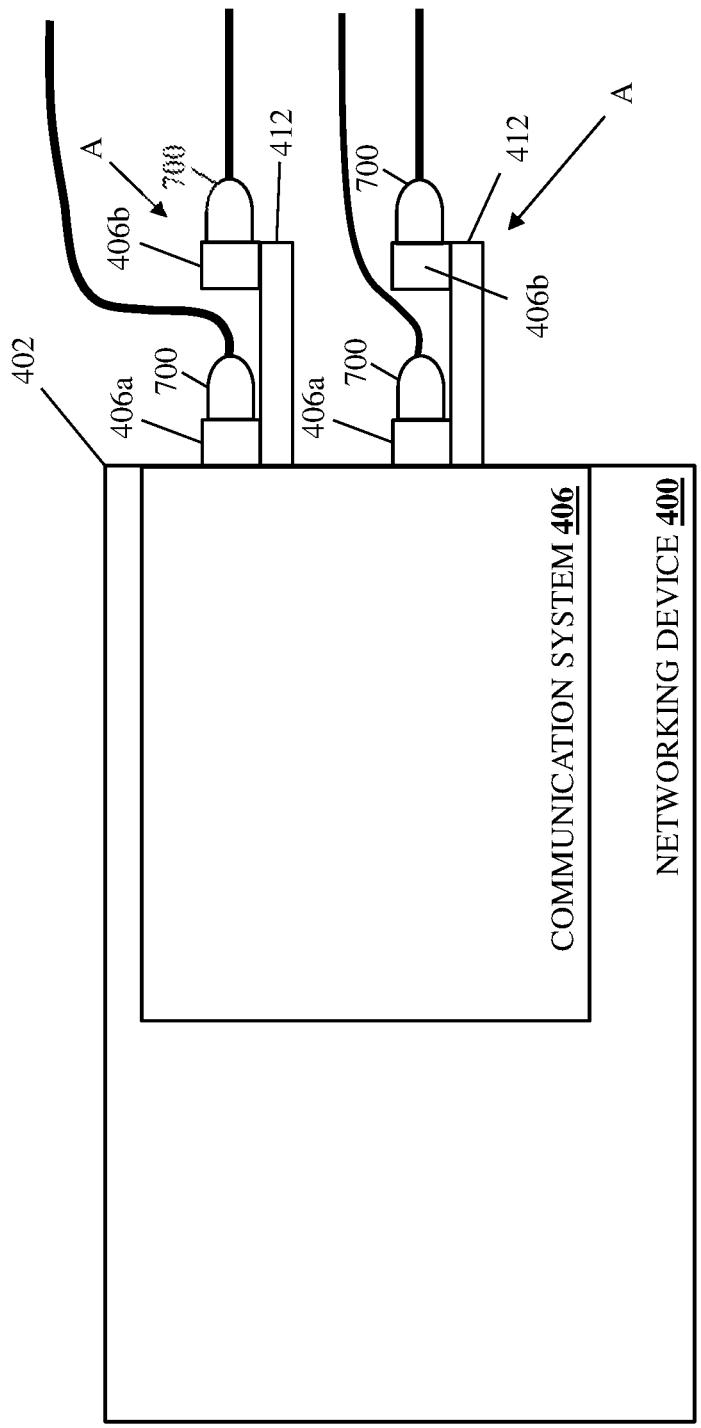
FIG. 7A is a schematic side view illustrating an embodiment of the networking device of FIGS. 4A-4E with cables coupled to its ports during the method of FIG. 6.

The method 600 begins at block 602 where a second networking device is coupled to first networking device(s). As discussed below, in different embodiments of block 602, the co-packaged optics networking system of the present disclosure may be coupled to one or more switch devices in order to couple the co-packaged optics networking system to a network such as the Internet. For example, with reference to FIGS. 7A and 7B, respective cables 700 (e.g., optical cables with the MPO connectors that connect to the MPO optical ports described above) may be coupled to any of the first ports 406*a*, the second ports 406*b*, and the third ports 406*c* on the networking device 400 discussed above with reference to FIGS. 4A-4E. For example, the support bases 412 provided for the top row 408 and the bottom row 410 of the networking device 400 may be moved relative to the chassis 402 from their retracted orientation B illustrated in FIGS. 4C and 4E to their extended orientation A illustrated in FIGS. 4B and 4D, and respective cables 700 may be connected (e.g., via connectors on the ends of each of those cables) to each of the first ports 406*a*, the second ports 406*b*, and the third ports 406*c*.

Figure 8A:
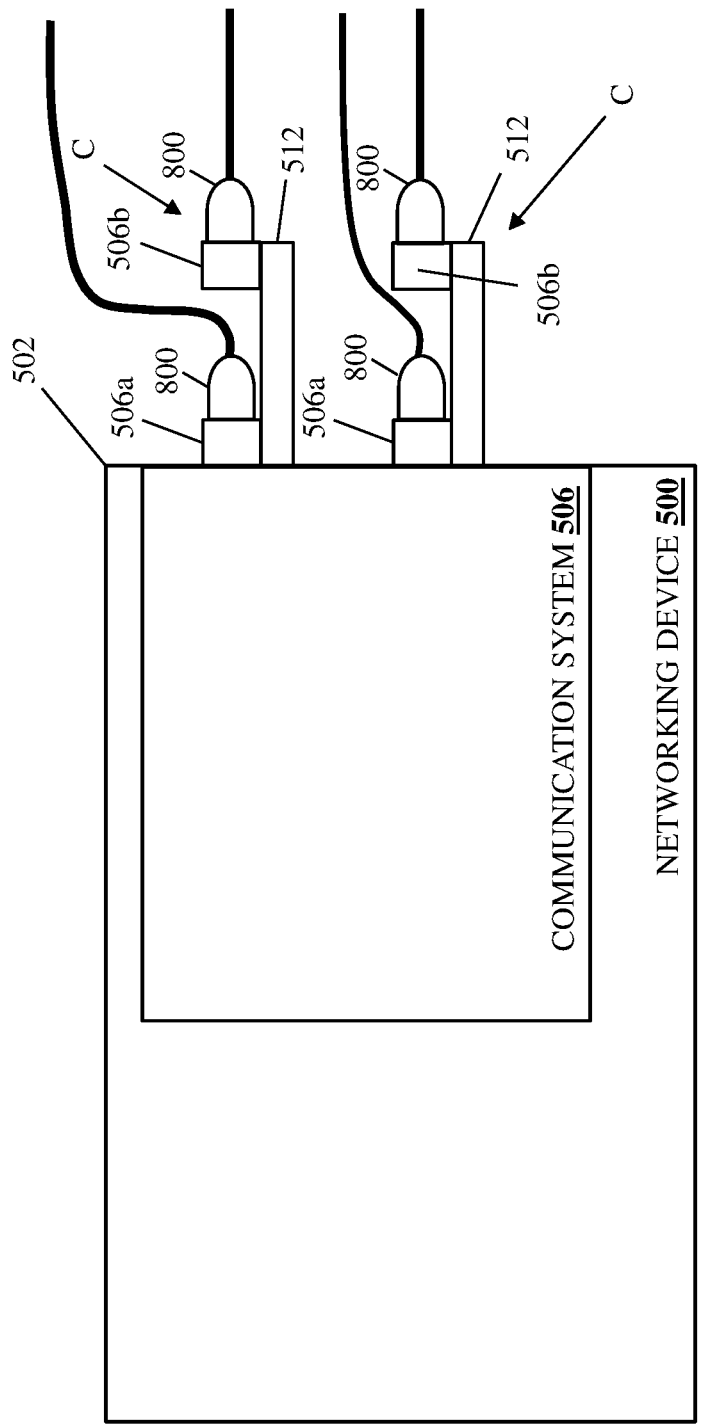
FIG. 8A is a schematic side view illustrating an embodiment of the networking device of FIGS. 5A-5E with cables coupled to its ports during the method of FIG. 6.
Figure 8B:
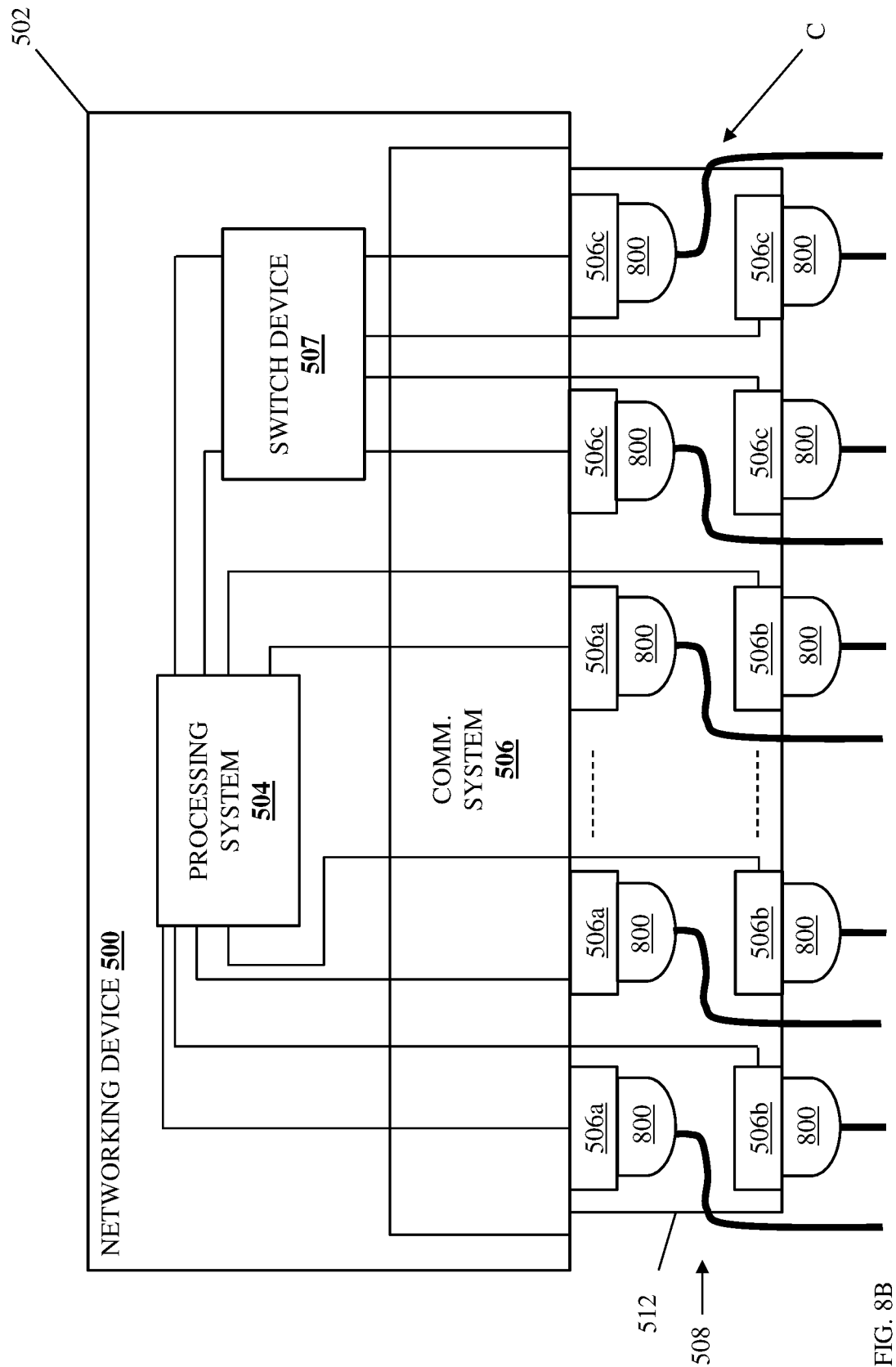
FIG. 8B is a schematic top view illustrating an embodiment of the networking device of FIGS. 5A-5E with cables coupled to its ports during the method of FIG. 6.

Similarly, with reference to FIGS. 8A and 8B, respective cables 800 (e.g., optical cables with the MPO connectors that connect to the MPO optical ports described above) may be coupled to each of the first ports 806*a*, the second ports 806*b*, and the third ports 806*c* on the networking device 500 discussed above with reference to FIGS. 5A-5E. For example, the support bases 812 provided for the top row 808 and the bottom row 810 of the networking device 800 may be moved relative to the chassis 802 from their retracted orientation D illustrated in FIGS. 5C and 5E to their extended orientation C illustrated in FIGS. 5B and 5D, and respective cables 800 may be connected (e.g., via connectors on the ends of each of those cables) to each of the first ports 506*a*, the second ports 506*b*, and the third ports 506*c*.

Figure 9A:
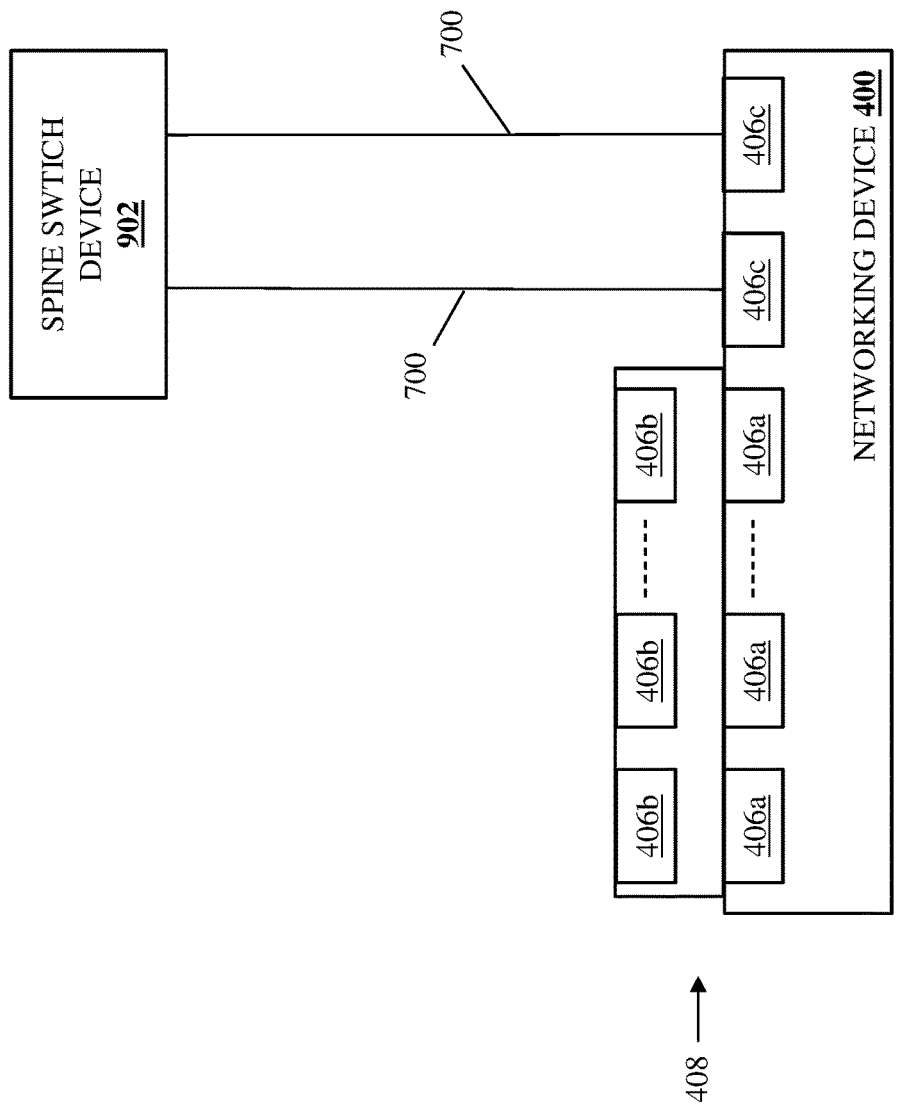
FIG. 9A is a schematic view illustrating an embodiment of the networking device of FIGS. 4A-4E connected to a plurality of spine switch devices during the method of FIG. 6.

With reference to FIG. 9A, a first networking configuration 900 is illustrated for the networking device 400 discussed above with reference to FIGS. 4A-4E. As will be appreciated by one of skill in the art in possession of the present disclosure, the first networking configuration 900 provides an example of the coupling of the third ports 406*c* in the top row 408 on the networking device 400 to a spine switch device 902, and one of skill in the art in possession of the present disclosure will appreciate how the third ports 406*c* in the bottom row 410 on the networking device 400 may be coupled to a spine switch device in a similar manner. Furthermore, while the coupling of the first switch ports 406a and the second switch ports 406b to other devices via the cables 700 is not illustrated in FIG. 9, one of skill in the art in possession of the present disclosure will recognize how cables 700 connected to the first switch ports 406a and the second switch ports 406b in FIGS. 7A and 7B may be connected to server devices and/or other devices in a datacenter while remaining within the scope of the present disclosure. As can be seen in FIG. 9A, each of the third ports 406c in the top row 408 of the networking device 400 may be coupled via a respective cable 700 to the same spine switch device 902, which as discussed below provides bandwidth-level redundancy.

Figure 10A:
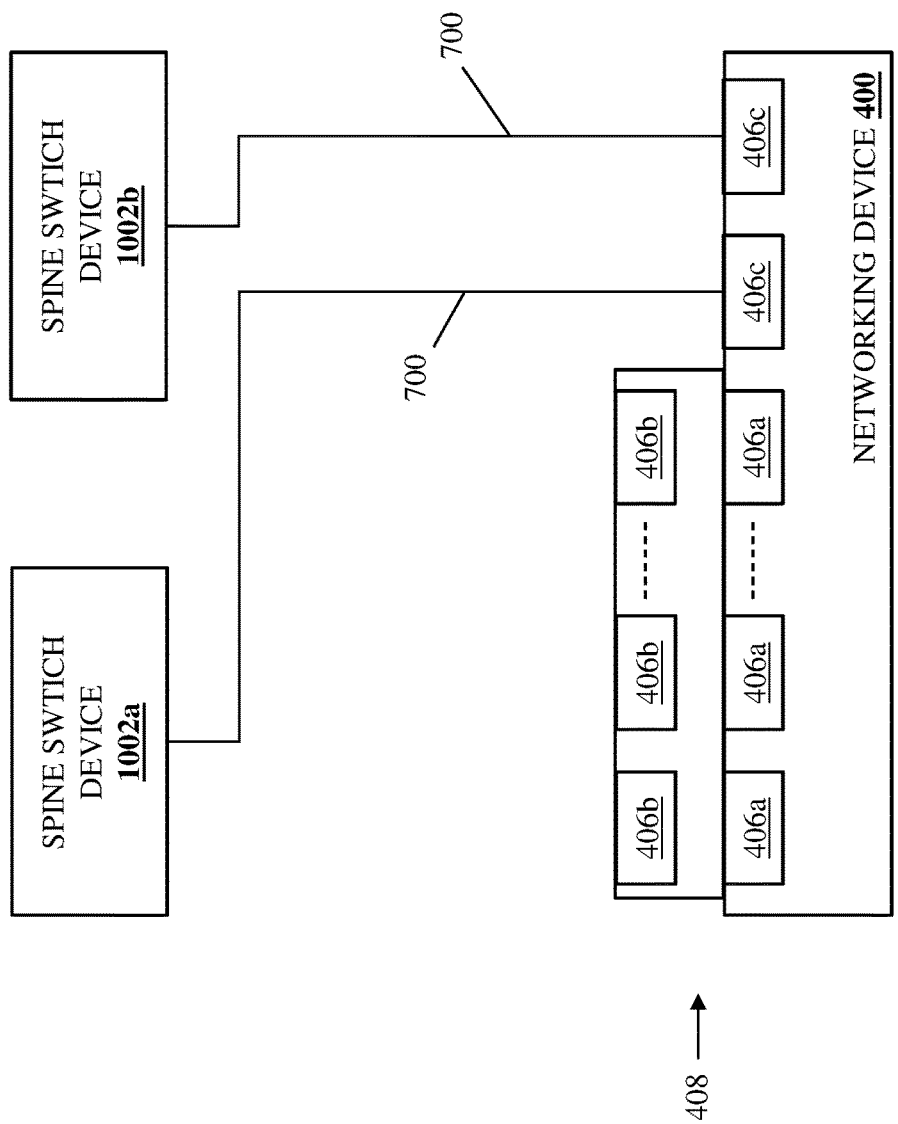
FIG. 10A is a schematic view illustrating an embodiment of the networking device of FIGS. 5A-5E connected to a plurality of spine switch devices during the method of FIG. 6.

With reference to FIG. 10A, a second networking configuration 1000 is illustrated for the networking device 400 discussed above with reference to FIGS. 4A-4E. As will be appreciated by one of skill in the art in possession of the present disclosure, the second networking configuration 1000 provides an example of the coupling of respective third ports 406c in the top row 408 on the networking device 400 to a pair of spine switch devices 1002a and 1002b, and one of skill in the art in possession of the present disclosure will appreciate how the third ports 406c in the bottom row 410 on the networking device 400 may be coupled to spine switch devices in a similar manner. Furthermore, while the coupling of the first switch ports 406a and the second switch ports 406b to other devices via the cables 700 is not illustrated in FIG. 10A, one of skill in the art in possession of the present disclosure will recognize how cables 700 connected to the first switch ports 406a and the second switch ports 406b in FIGS. 7A and 7B may be connected to server devices and/or other devices in a datacenter while remaining within the scope of the present disclosure. As can be seen in FIG. 10, one of the third ports 406c in the top row 408 of the networking device 400 may be coupled via a cable 700 to the spine switch device 1002a, and one of the third ports 406c in the top row 408 of the networking device 400 may be coupled via a cable 700 to the spine switch device 1002b, which as discussed below provides switch-level redundancy.

Figure 11A:
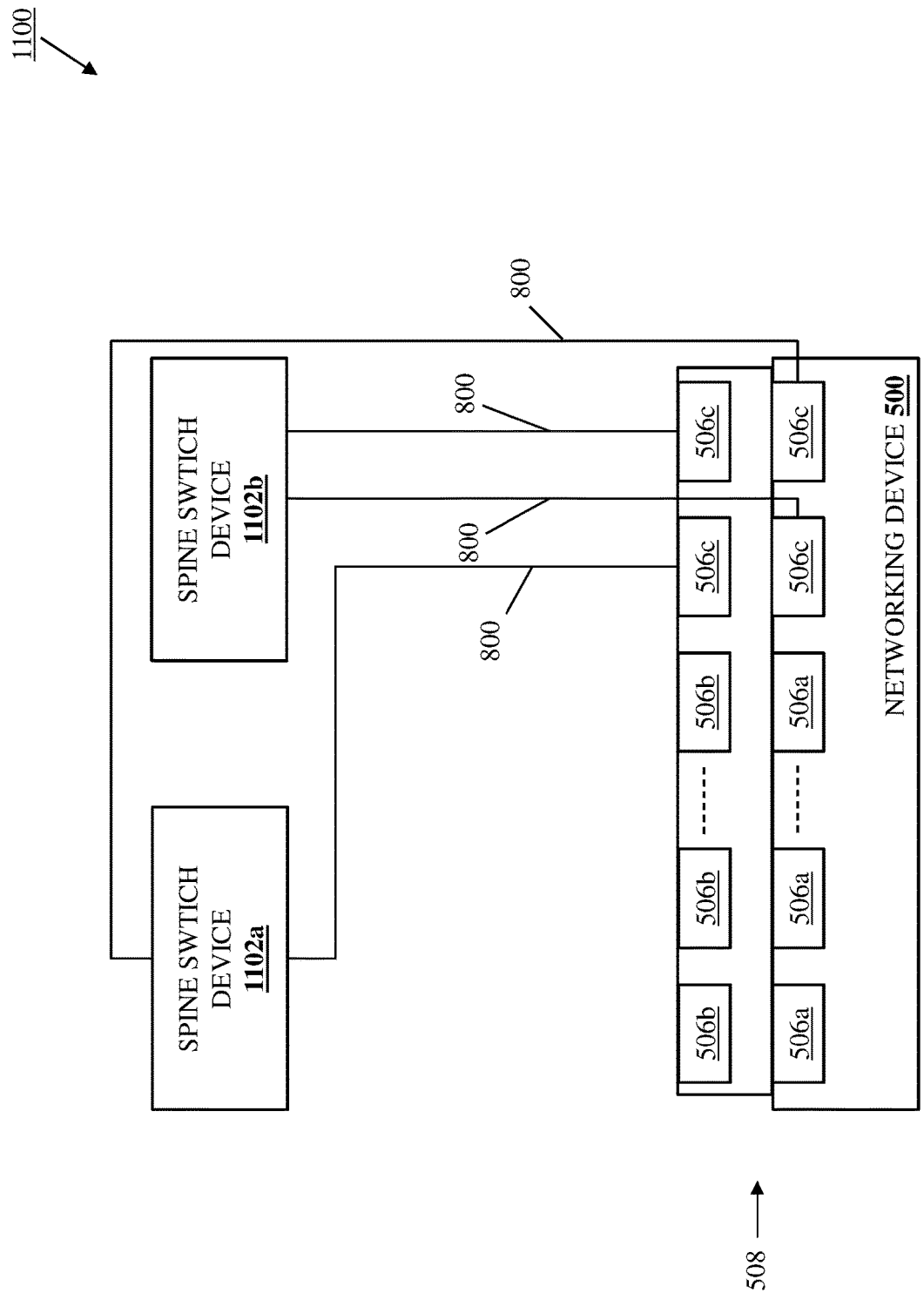
FIG. 11A is a schematic view illustrating an embodiment of the networking device of FIGS. 5A-5E connected to a plurality of spine switch devices for operation during the method of FIG. 6.

With reference to FIG. 11A, a first networking configuration 1100 is illustrated for the networking device 500 discussed above with reference to FIGS. 5A-5E. As will be appreciated by one of skill in the art in possession of the present disclosure, the first networking configuration 1100 provides an example of the coupling of respective adjacent pairs of third ports 506c (e.g., "fixed"/"sliding" third port pairs that are immediately adjacent in the retracted orientation D) in the top row 508 on the networking device 500 to different spine switch devices 1102a and 1102b, and one of skill in the art in possession of the present disclosure will appreciate how the third ports 506c in the bottom row 510 on the networking device 500 may be coupled to spine switch devices in a similar manner. Furthermore, while the coupling of the first switch ports 506a and the second switch ports 506b to other devices via the cables 800 is not illustrated in FIG. 11, one of skill in the art in possession of the present disclosure will recognize how cables 800 connected to the first switch ports 506a and the second switch ports 506b In FIGS. 8A and 8B may be connected to server devices and/or other devices in a datacenter while remaining within the scope of the present disclosure.

As can be seen in FIG. 11A, a pair of the third ports 506c in the top row 508 of the networking device 500 (e.g., the ports designated as "16A" and "16B" in the examples provided above) may be coupled via respective cables 800 to different spine switch devices 1102a and 1102b (e.g., with a "fixed" third port 506c coupled to the spine switch device 1102b, and its adjacent "sliding" third port 506c coupled to the spine switch device 1102a), and a pair of the third ports 506c in the top row 508 of the networking device 500 (e.g., the ports designated as "17A" and "17B" in the examples provided above) may be coupled via respective cables 800 to different spine switch devices 1102a and 1102b (e.g., with a "fixed" third port 506c coupled to the spine switch device 1102a, and its adjacent "moveable" third port 506c coupled to the spine switch device 1102b), which as discussed below provides port-level redundancy to the multiple spine switch devices.

Figure 12A:
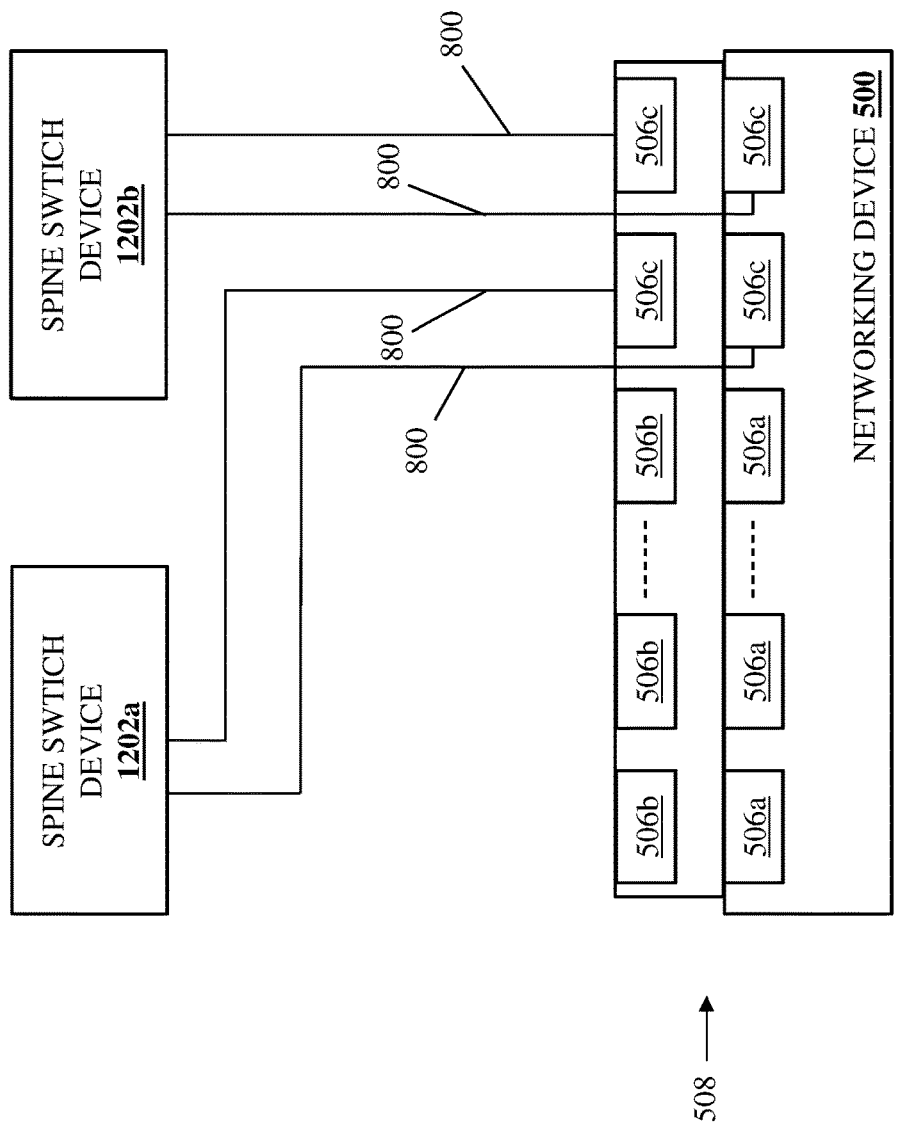
FIG. 12A is a schematic view illustrating an embodiment of the networking device of FIGS. 5A-5E connected to a plurality of spine switch devices for operation during the method of FIG. 6.

With reference to FIG. 12A, a second networking configuration 1200 is illustrated for the networking device 500 discussed above with reference to FIGS. 5A-5E. As will be appreciated by one of skill in the art in possession of the present disclosure, the second networking configuration 1200 provides an example of the coupling of respective pairs of third ports 506c (e.g., "fixed"/"sliding" third port pairs that are immediately adjacent in the retracted orientation D) in the top row 508 on the networking device 500 to respective spine switch devices 1102a and 1102b, and one of skill in the art in possession of the present disclosure will appreciate how the third ports 506c in the bottom row 510 on the networking device 500 may be coupled to spine switch devices in a similar manner. Furthermore, while the coupling of the first switch ports 506a and the second switch ports 506b to other devices via the cables 800 is not illustrated in FIG. 12, one of skill in the art in possession of the present disclosure will recognize how cables 800 connected to the first switch ports 506a and the second switch ports 506b in FIGS. 8A and 8B may be connected to server devices and/or other devices in a datacenter while remaining within the scope of the present disclosure. As can be seen in FIG. 12A, each of a pair of the third ports 506c in the top row 508 of the networking device 500 (e.g., the ports designated as "16A" and "16B" in the examples provided above) may be coupled via a respective cable 800 to the spine switch device 1202a, and each of a pair of the third ports 506c in the top row 508 of the networking device 500 (e.g., the ports designated as "17A" and "17B" in the examples provided above) may be coupled via a respective cable 800 to the spine switch device 1202b, which as discussed below provides switch-level and bandwidth-level redundancy.

Figure 9B:
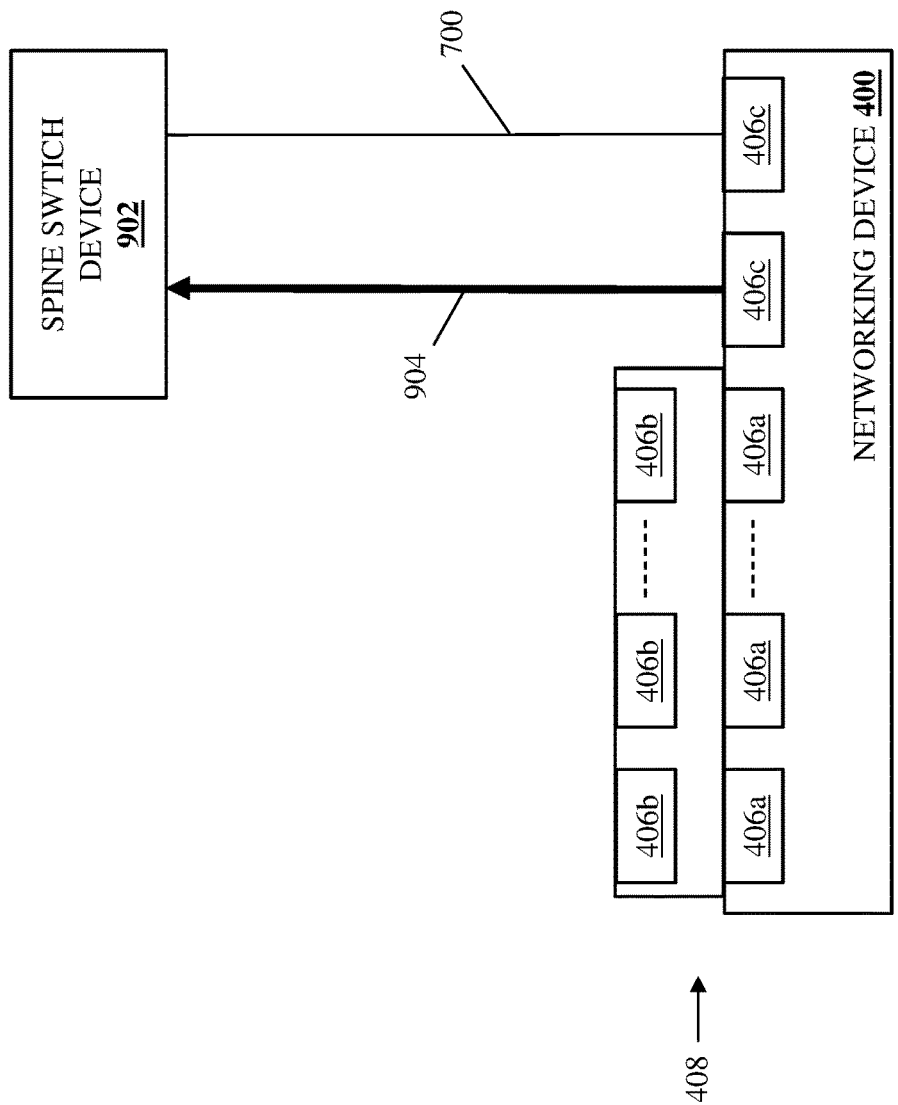
FIG. 9B is a schematic view illustrating an embodiment of the networking device of FIG. 9A operating during the method of FIG. 6.

The method 600 then proceeds to block 604 where the second networking device routes data received from its processing system through a network connected to the first networking device(s) via a first subset of third ports. With reference to the first networking configuration 900 for the networking device 400 discussed above with reference to FIG. 9A, in an embodiment of block 604, the networking device 400 may perform data transmission operations 904 that include transmitting data from the processing system 404 in the networking device 400 via one of the third ports 406c (e.g., the third port 406c designated as "16" in the examples above) and to the spine switch device 902, as illustrated in FIG. 9B. For example, the processing system 404 may "build" connectivity to both of the third ports 406c on the top row 408 of the networking device 400, and one of the third ports 406c (e.g., the third port 406c designated as "16" in the examples above) may be designated as a default port (e.g., by a user, by software, etc.). As will be appreciated by one of skill in the art in possession of the present disclosure, the networking device 400 may be configured to utilize only the third port 406c designated as the default port (e.g., when all of the third ports 406c are available) unless that third port 406c becomes unavailable, in which case the other third port 406c may be utilized by the networking device 400 (e.g., in response to the loss of a signal on the third port 406c designated as the default port and the presence of a signal on the other third port 406c). As such, in some examples there may not utilize cross-mapping of the third ports 406c in the networking device 400. Subsequently, in the event both third ports 406c in the top row 408 of the networking device 400 are active (e.g., signals are detected on both of those third ports 406c), the processing system 404 in the networking device 400 may transmit data via the third port 406c that is designated as the default port.

Figure 10B:
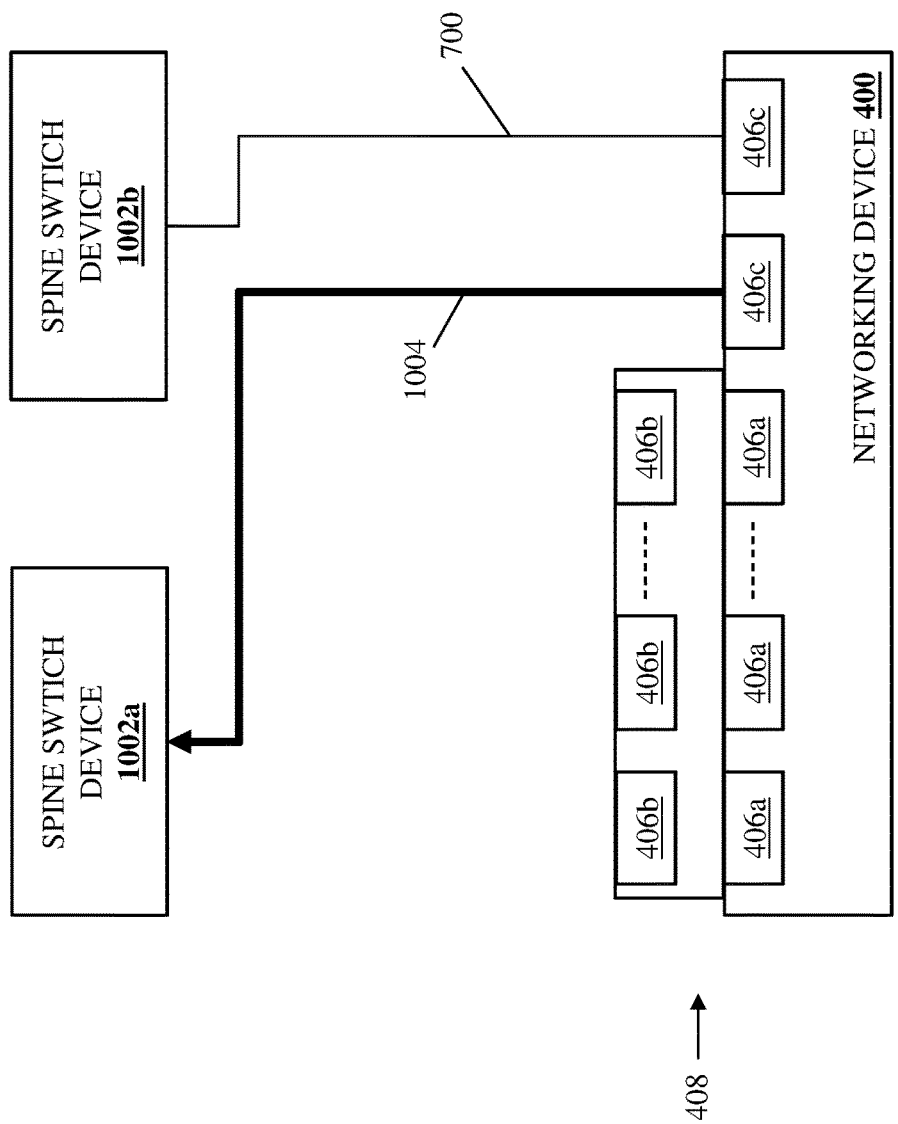
FIG. 10B is a schematic view illustrating an embodiment of the networking device of FIG. 10A operating during the method of FIG. 6.

With reference to the second networking configuration 1000 for the networking device 400 discussed above with reference to FIG. 10A, in an embodiment of block 604, the networking device 400 may perform data transmission operations 1004 that include transmitting data from the processing system 404 in the networking device 404 via one of the third ports 406c (e.g., the third port 406c designated as "16" in the examples above) and to the spine switch device 1002a, as illustrated in FIG. 10B. For example, the processing system 404 may "build" connectivity to both of the third ports 406c on the top row 408 of the networking device 400, and one of the third ports 406c (e.g., the third port 406c designated as "16" in the examples above) may be designated as a default port (e.g., by a user, by software, etc.). As discussed above, utilization of one of the third ports 406c may be based on detected signals and default designation of one of those third ports 406c (with the third port 406c designated as the default port utilized when signals are detected in both third ports 406c, and the other third port 406c utilized when no signal is detected on the third port 406c designated as the default port). Subsequently, in the event both third ports 406c in the top row 408 of the networking device 400 are active (e.g., signals are detected on both of those third ports 406c), the processing system 404 in the networking device 400 may transmit data via the third port 406c that is designated as the default port.

Figure 11B:
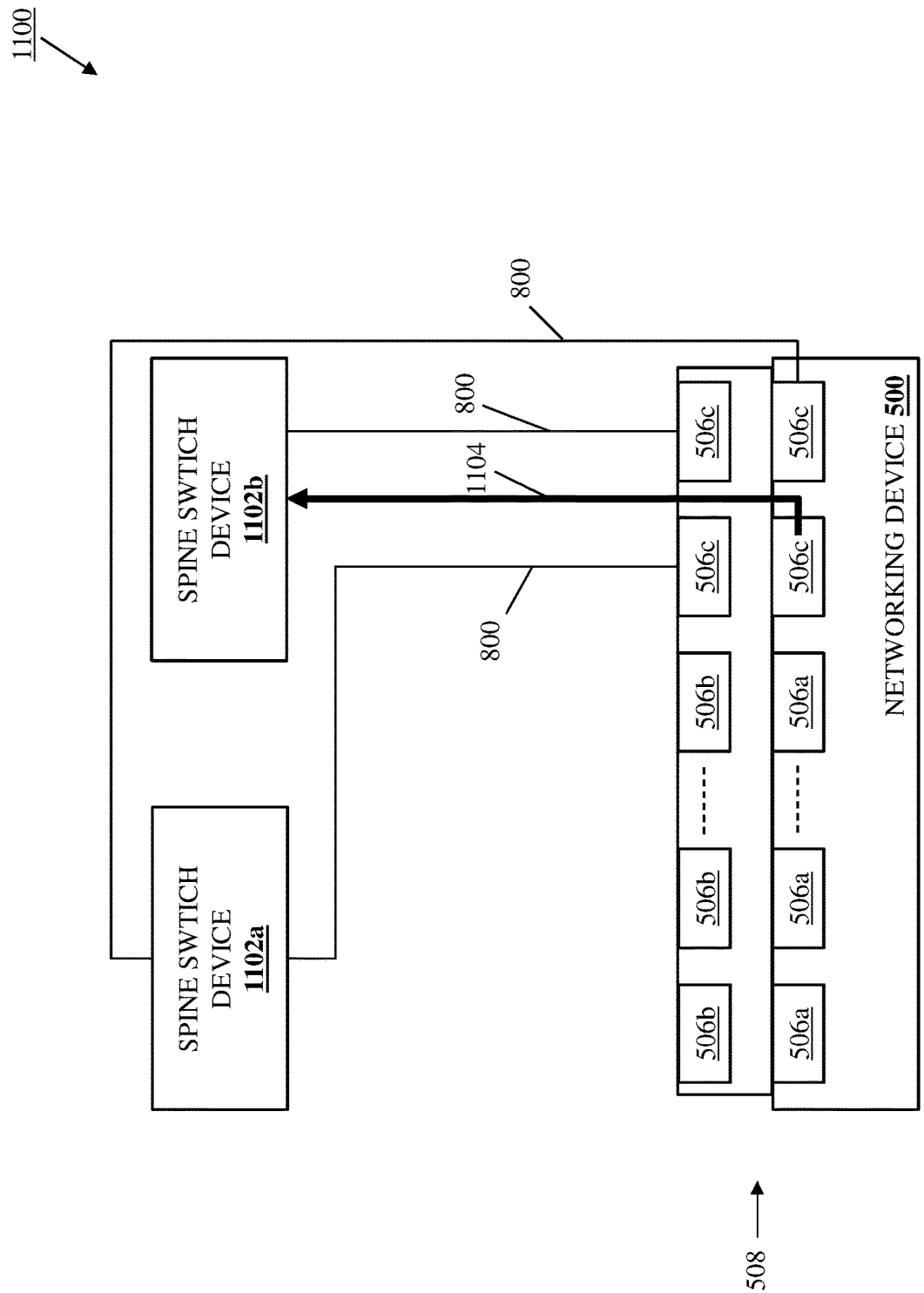
FIG. 11B is a schematic view illustrating an embodiment of the networking device of FIG. 11A operating during the method of FIG. 6.

With reference to the first networking configuration 1100 for the networking device 500 discussed above with reference to FIG. 11A, in an embodiment of block 604, the networking device 500 may perform data transmission operations 1104 that include transmitting data from the processing system 504 in the networking device 500 via the switch device 507 and through one of the third ports 506c (e.g., the third port 506c designated as "16A" in the examples above) and to the spine switch device 1102b, as illustrated in FIG. 11B. For example, the switch device 507 may "build" connectivity to both of the third ports 506c on the top row 508 of the networking device 500, and one of the third ports 506c (e.g., the third port 506c designated as "16A" in the examples above) may be designated as a default port (e.g., by a user, by software, etc.). Similarly as discussed above, utilization of one of the third ports 506c may be based on detected signals and default designation of one of those third ports 506c (with the third port 506c designated as the default port utilized when signals are detected in both third ports 406c, and the other third port 506c utilized when no signal is detected on the third port 506c designated as the default port). For example, for any pair of "fixed"/"slidable" third ports 506c (e.g., the port pair designated as "16A"/"16B"), the "fixed" third port 506c may be designated as the default port (a status that may be changed by a user via, for example, CLI access to the networking device 500). Subsequently, in the event multiple third ports 506c in the top row 508 of the networking device 500 are active (e.g., signals are detected on each of those third ports 506c), the switch device 507 in the networking device 500 may transmit data via the third port 506c that is designated as the default port.

Figure 12B:
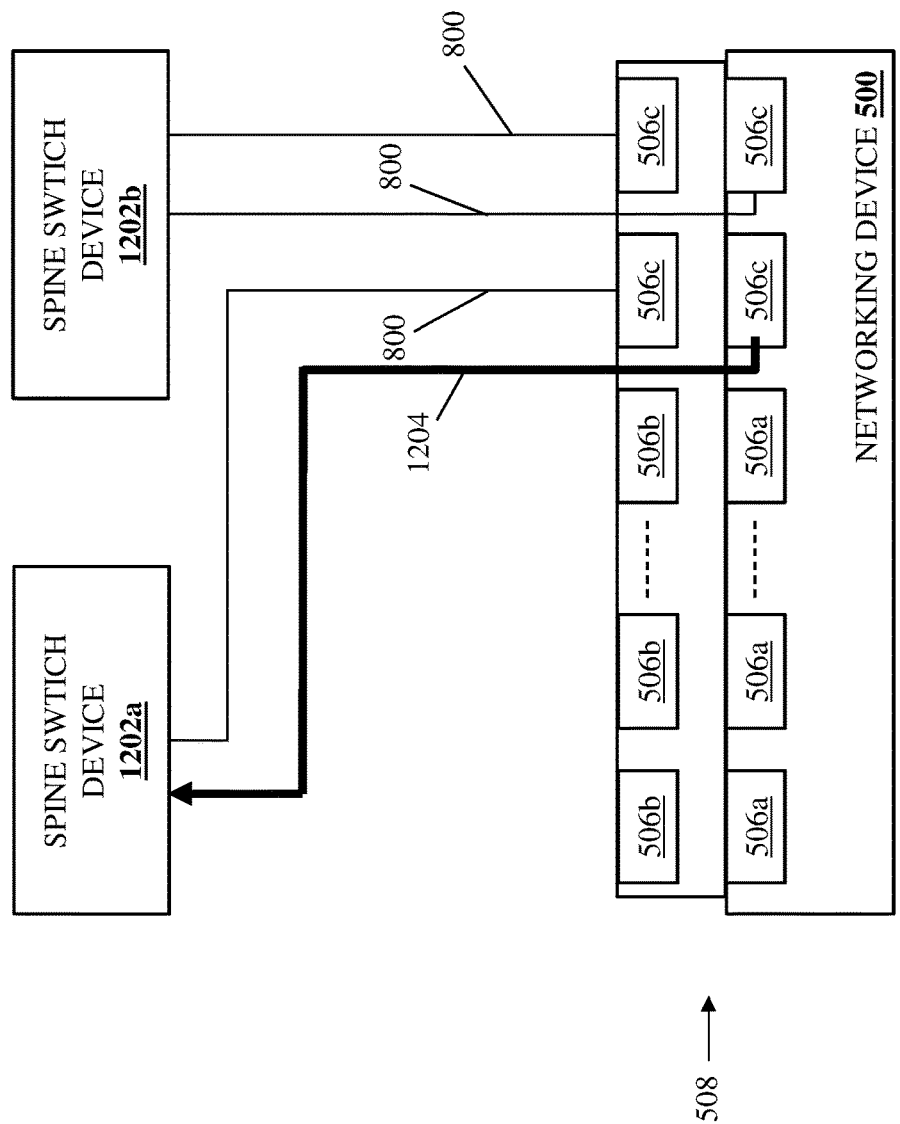
FIG. 12B is a schematic view illustrating an embodiment of the networking device of FIG. 12A operating during the method of FIG. 6.

With reference to the first networking configuration 1200 for the networking device 500 discussed above with reference to FIG. 12A, in an embodiment of block 604, the networking device 500 may perform data transmission operations 1204 that include transmitting data from the processing system 504 in the networking device 500 via the switch device 507 and through one of the third ports 506c (e.g., the third port 406c designated as "16A" in the examples above) and to the spine switch device 1202a, as illustrated in FIG. 12B. For example, the switch device 507 may "build" connectivity to both of the third ports 506c on the top row 508 of the networking device 500, and one of the third ports 506c (e.g., the third port 506c designated as "16A" in the examples above) may be designated as a default port (e.g., by a user, by software, etc.). Similarly as discussed above, utilization of one of the third ports 506c may be based on detected signals and default designation of one of those third ports 506c (with the third port 506c designated as the default port utilized when signals are detected in both third ports 406c, and the other third port 506c utilized when no signal is detected on the third port 506c designated as the default port). For example, for any pair of "fixed"/"slidable" third ports 506c (e.g., the port pair designated as "16A"/"16B"), the "fixed" third port 506c may be designated as the default port (a status that may be changed by a user via, for example, CLI access to the networking device 500). Subsequently, in the event multiple third ports 506c in the top row 508 of the networking device 500 are active (e.g., signals are detected on each of those third ports 506c), the switch device 507 in the networking device 500 may transmit data via the third port 506c that is designated as the default port. However, while several specific examples of the transmission of data via a default uplink/third port on a top row of a networking device have been described, one of skill in the art in possession of the present disclosure will appreciate how default uplink/third ports on a bottom row of a networking device may be utilized in a similar manner.

The method 600 then proceeds to decision block 606 where it is determined whether data received from the processing system cannot reach the network via the first subset of third ports. In an embodiment, at decision block 606, the networking devices 400/500 may determine whether data received from its processing system 404/504 cannot reach a network via the third port 406c/506c that was used to transmit that data at block 604. As discussed above, the transmission of data via the third port 406c/506c at block 604 may be due to multiple third ports 406c/506c being available (e.g., having detectable signals) and that third port 406c/506c being designated as the default port. As such, at decision block 606, it may be determined whether data can reach a network via the default third port 406c/506c based on whether signal is present on the default third port 406c/506c, whether the default third port 406c/506c is "active", and/or using a variety of other techniques that one of skill in the art in possession of the present disclosure would recognize as allowing for the detection that data cannot reach a network via the default third port 406c/506c described below.

If, at decision block 606, it is determined that data received from the processing system can reach the network via the first subset of third ports, the method 600 returns to block 604. As such, the method 600 may loop such that the networking device 400/500 transmits data via the default third port 406c/506c as described above as long as it is not determined that data cannot reach the network via that default third port 406c/506c. However, while decision block 606 is described as being performed for a default third port 406c/506c, one of skill in the art in possession of the present disclosure will appreciate how decision block 606 may be performed for any currently utilized uplink/third port 406c/506c (e.g., a third port 406c/506c that previously "took over" for a default third port 406c/506c through which the network could no longer be reached) while remaining within the scope of the present disclosure as well.

Figure 9C:
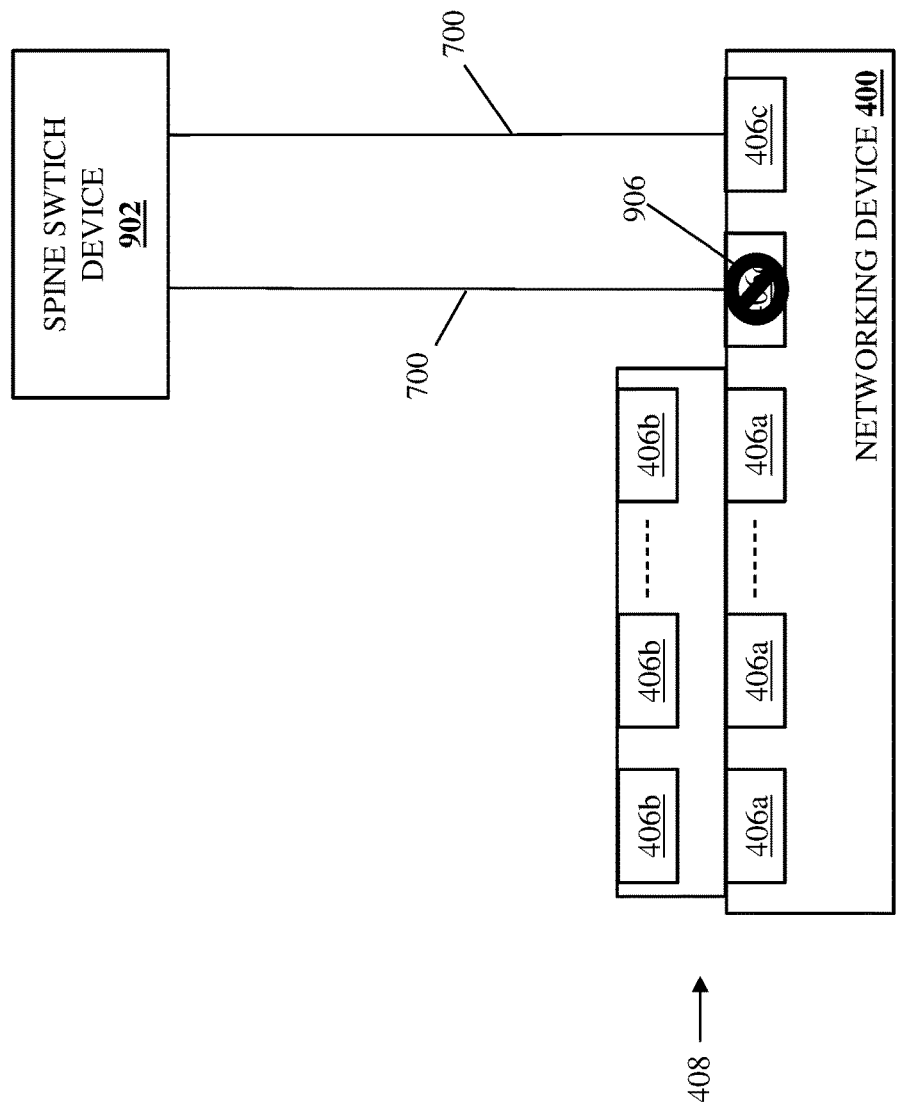
FIG. 9C is a schematic view illustrating an embodiment of the networking device of FIG. 9A operating during the method of FIG. 6.
Figure 9D:
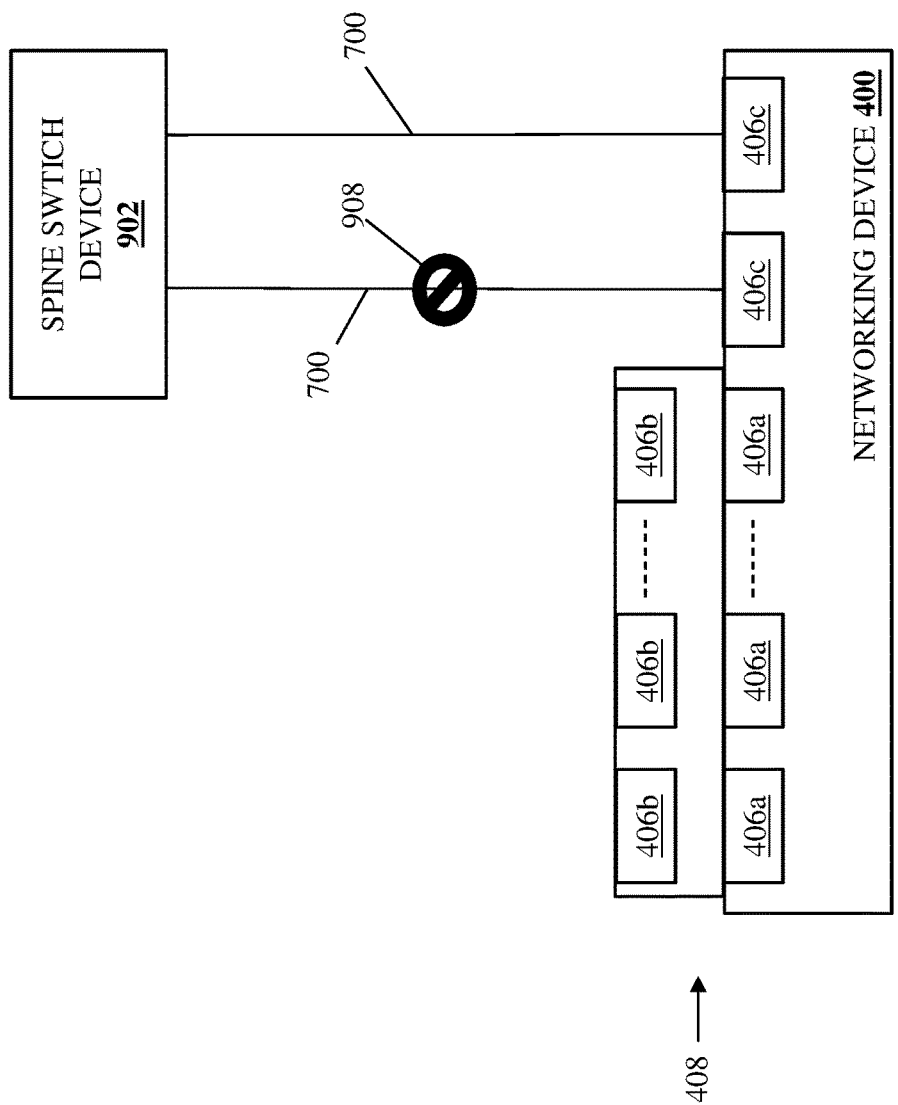
FIG. 9D is a schematic view illustrating an embodiment of the networking device of FIG. 9A operating during the method of FIG. 6.
Figure 9E:
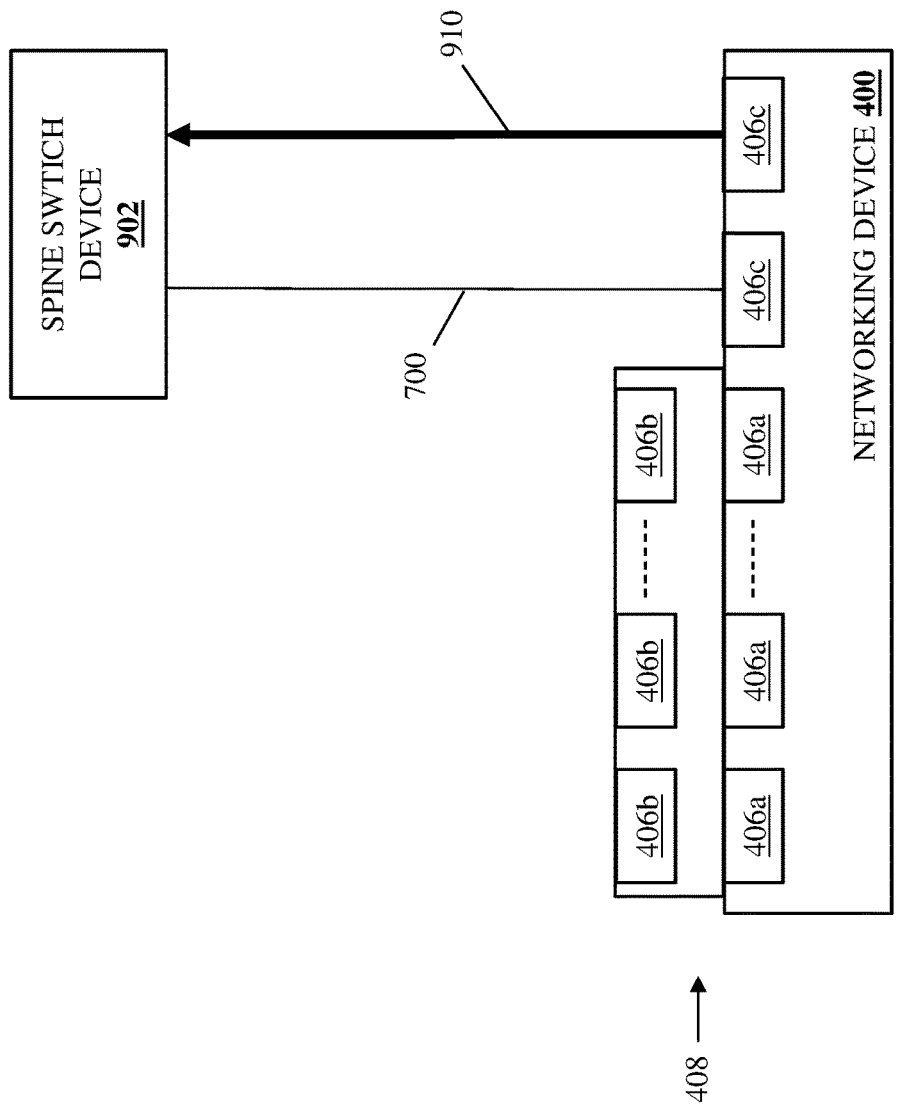
FIG. 9E is a schematic view illustrating an embodiment of the networking device of FIG. 9A operating during the method of FIG. 6.

If, at decision block 606, it is determined that data received from the processing system cannot reach the network via the first subset of third ports, the method 600 proceeds to block 608 where the switch device in the second networking device routes data received from its processing system through the network connection to the first networking device(s) via a second subset of third ports. With reference to FIGS. 9C and 9D, in an embodiment of block 608, the networking device 400 may determine that data received from the processing system 404 cannot reach the network via the third port 406c utilized at block 604 (e.g., the third port 406c designated as port "16" in the examples above) due to a port failure (e.g., as indicated by element 906 in FIG. 9C), due to a link failure (e.g., as indicated by element 908 in FIG. 9D), and/or due other network unreachability issues that would be apparent to one of skill in the art in possession of the present disclosure. In response, at block 608 the processing system 404 in the networking device 400 may perform data transmission operations 910 that include transmitting data from the processing system 404 in the networking device 404 via a different one of the third ports 406c (e.g., the third port 406c designated as "17" in the examples above) and to the spine switch device 902, as illustrated in FIG. 9E.

As discussed above, the processing system 404 may have "built" connectivity to both of the third ports 406c on the top row 408 of the networking device 400, and thus when data cannot reach the network via the one of the third ports 406c (e.g., the third port 406c designated as "16" in the examples above) designated as a default port, the other of those third ports 406c (e.g., the third port 406c designated as "17" in the examples above) may be utilized. However, one of skill in the art in possession of the present disclosure will appreciate how the first networking configuration 900 for the networking device 400 does not provide port-level redundancy, and thus in the event the spine switch device 902 become unavailable, the networking device 400 will not be able to transmit data to the network (i.e., because there is no available spine switch device).

Figure 10C:
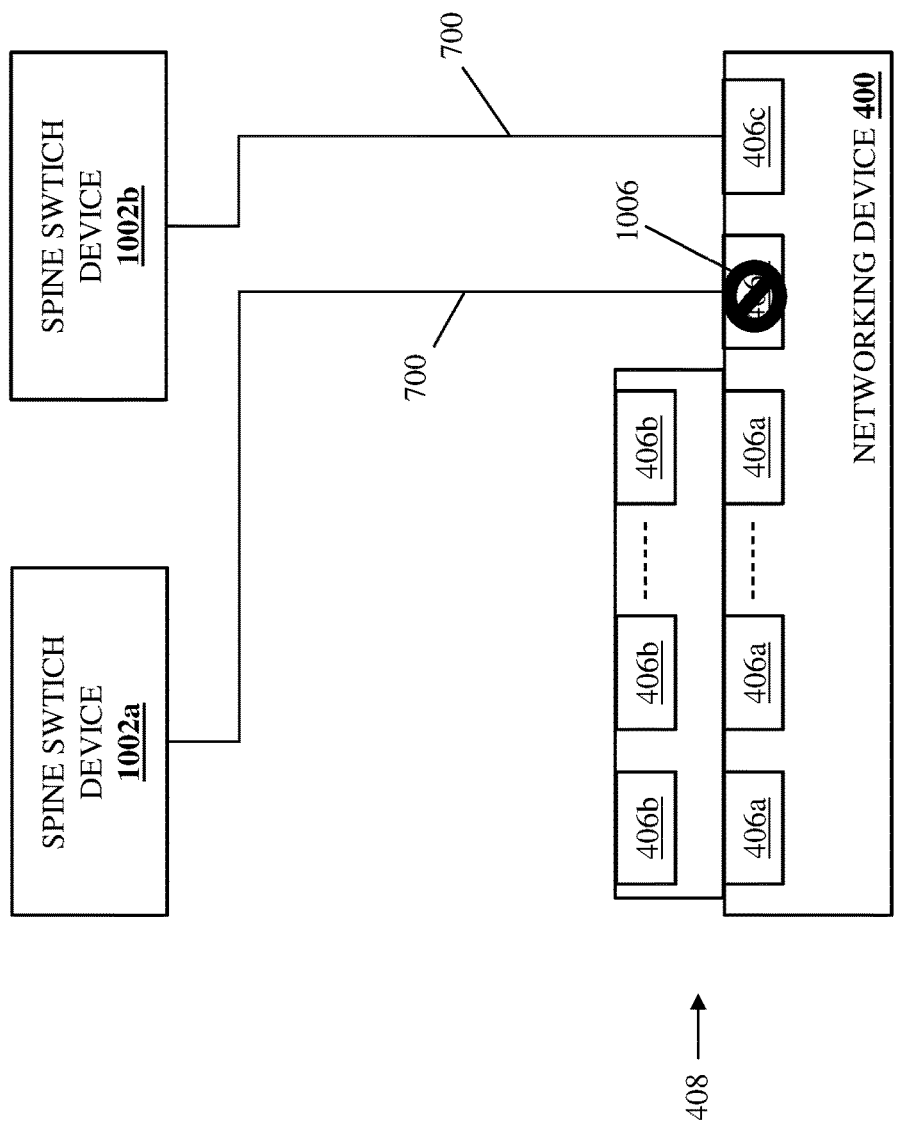
FIG. 10C is a schematic view illustrating an embodiment of the networking device of FIG. 10A operating during the method of FIG. 6.
Figure 10D:
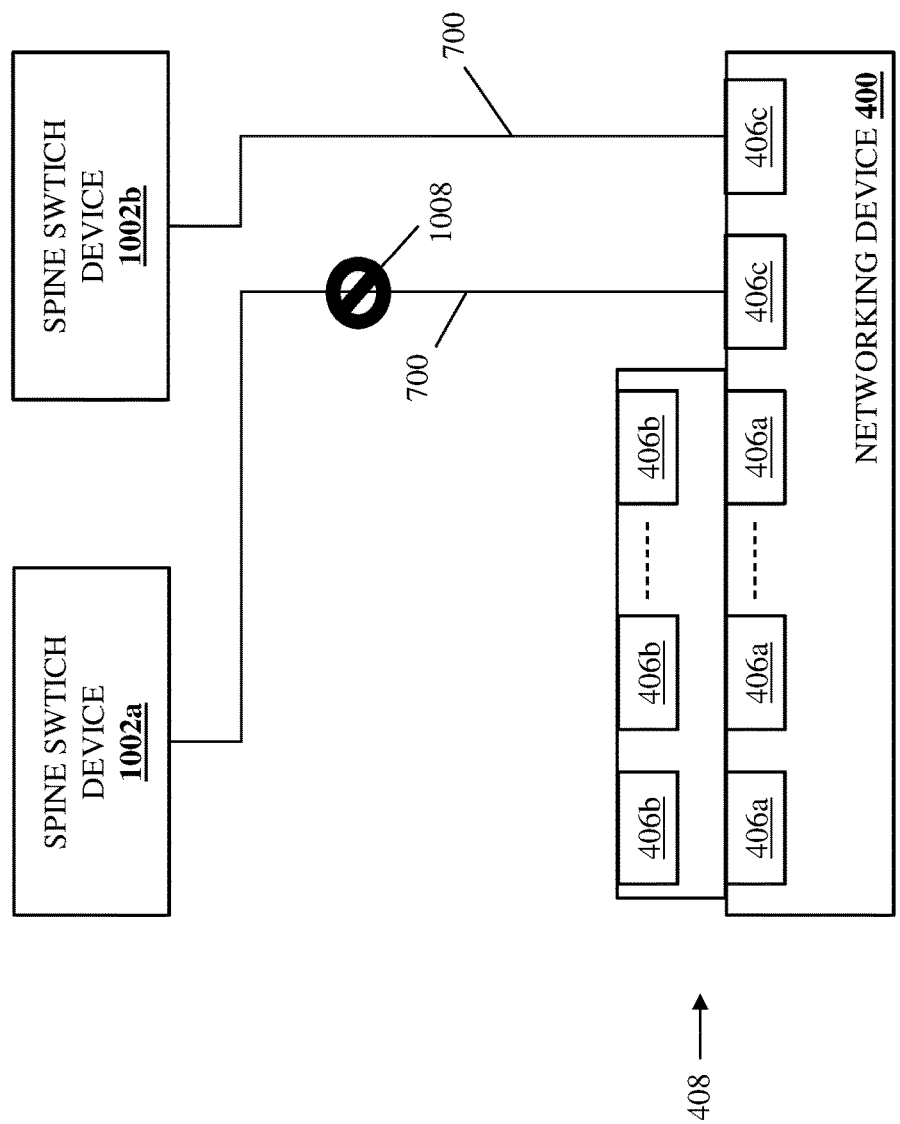
FIG. 10D is a schematic view illustrating an embodiment of the networking device of FIG. 10A operating during the method of FIG. 6.
Figure 10E:
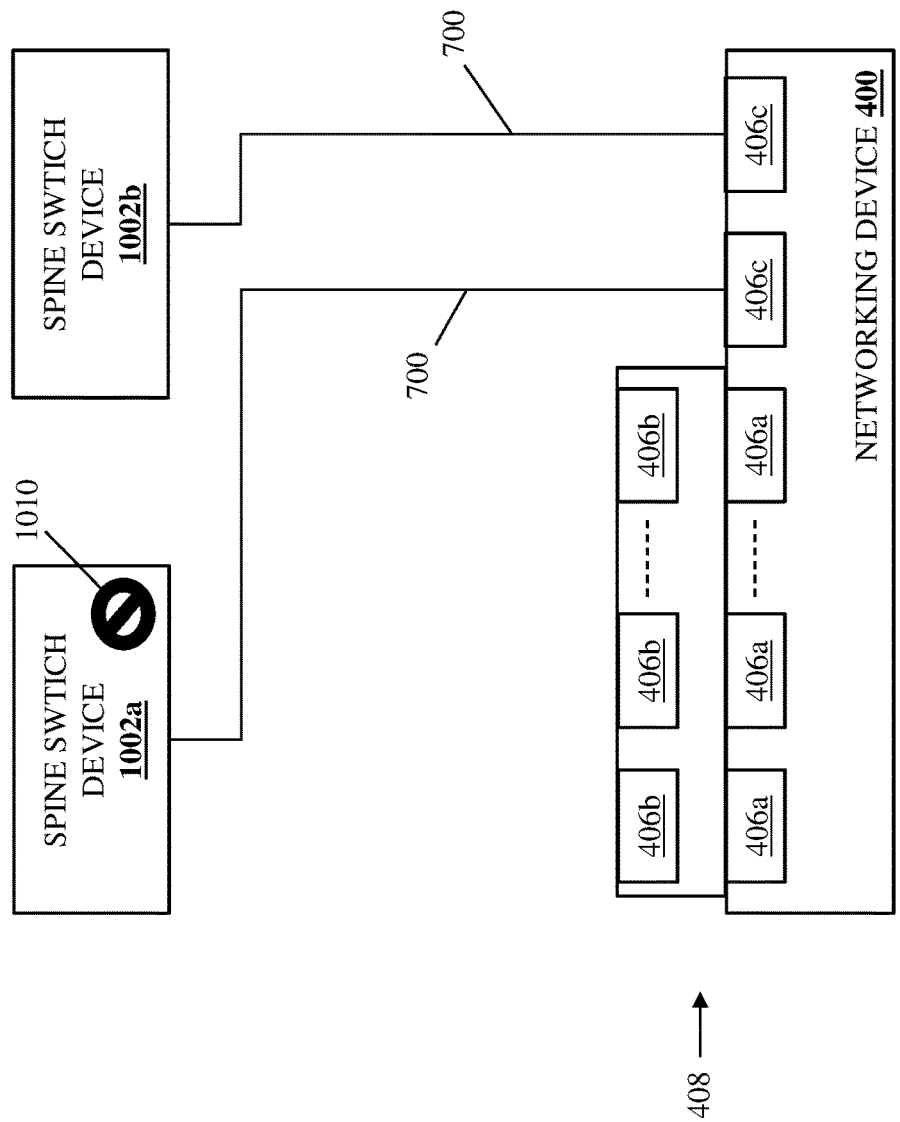
FIG. 10E is a schematic view illustrating an embodiment of the networking device of FIG. 10A operating during the method of FIG. 6.
Figure 10F:
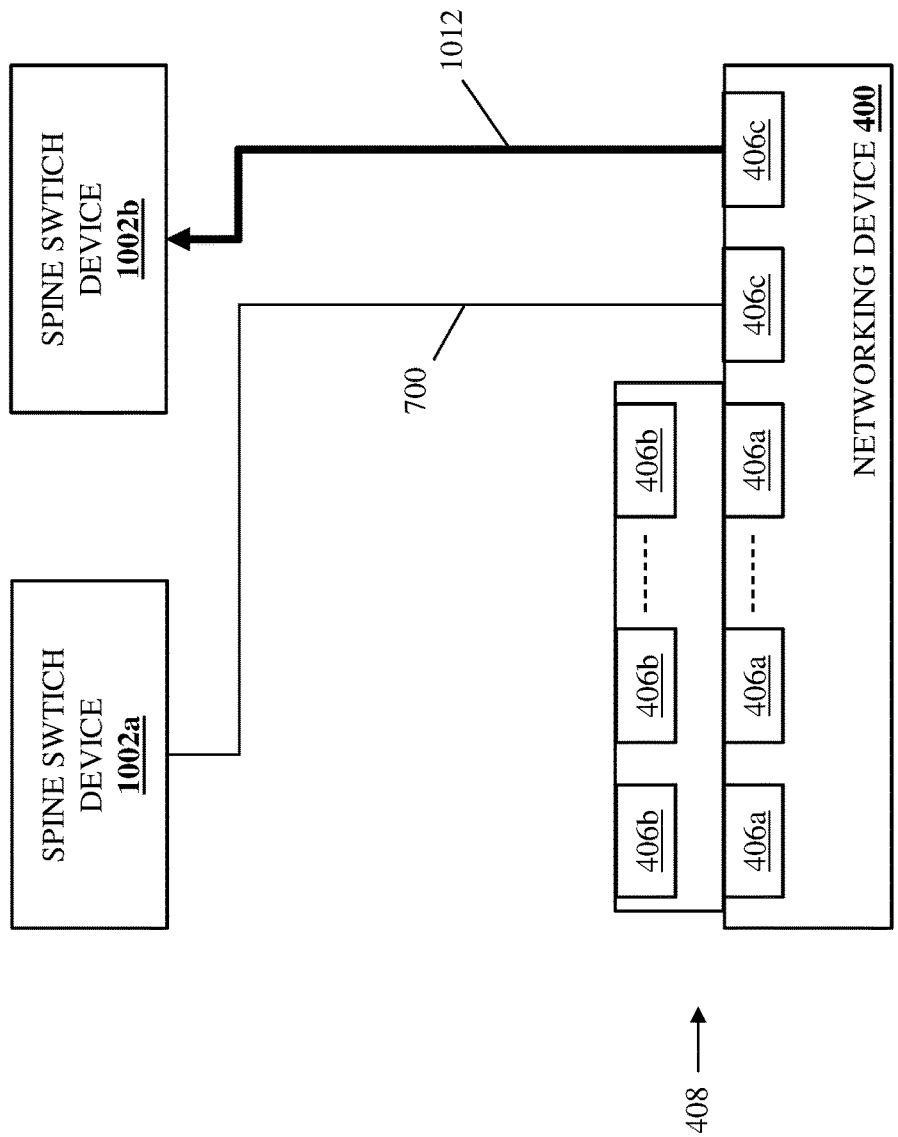
FIG. 10F is a schematic view illustrating an embodiment of the networking device of FIG. 10A operating during the method of FIG. 6.

With reference to FIGS. 10C, 10D, and 10E, in an embodiment of block 608, the networking device 400 may determine that data received from the processing system 404 cannot reach the network via the third port 406c utilized at block 604 (e.g., the third port 406c designated as port "16" in the examples above) due to a port failure (e.g., as indicated by element 1006 in FIG. 10C), due to a link failure (e.g., as indicated by element 1008 in FIG. 10D), due to a switch unavailability (e.g., as indicated by element 1010 in FIG. 10E), and/or due other network unreachability issues that would be apparent to one of skill in the art in possession of the present disclosure. In response, at block 608 the processing system 404 in the networking device 400 may perform data transmission operations 1012 that include transmitting data from the processing system 404 in the networking device 404 via a different one of the third ports 406c (e.g., the third port 406c designated as "17" in the examples above) and to the spine switch device 1002b, as illustrated in FIG. 10F.

As discussed above, the processing system 404 may have "built" connectivity to both of the third ports 406c on the top row 408 of the networking device 400, and thus when data cannot reach the network via the one of the third ports 406c (e.g., the third port 406c designated as "16" in the examples above) designated as a default port, the other of those third ports 406c (e.g., the third port 406c designated as "17" in the examples above) may be utilized. As will be appreciated by one of skill in the art in possession of the present disclosure, the second networking configuration 1000 for the networking device 400 provides port-level redundancy, as in the event the spine switch device 1002a become unavailable, the networking device 400 may transmit data to the network via the spine switch device 1002b (i.e., because there is an available spine switch device).

Figure 11C:
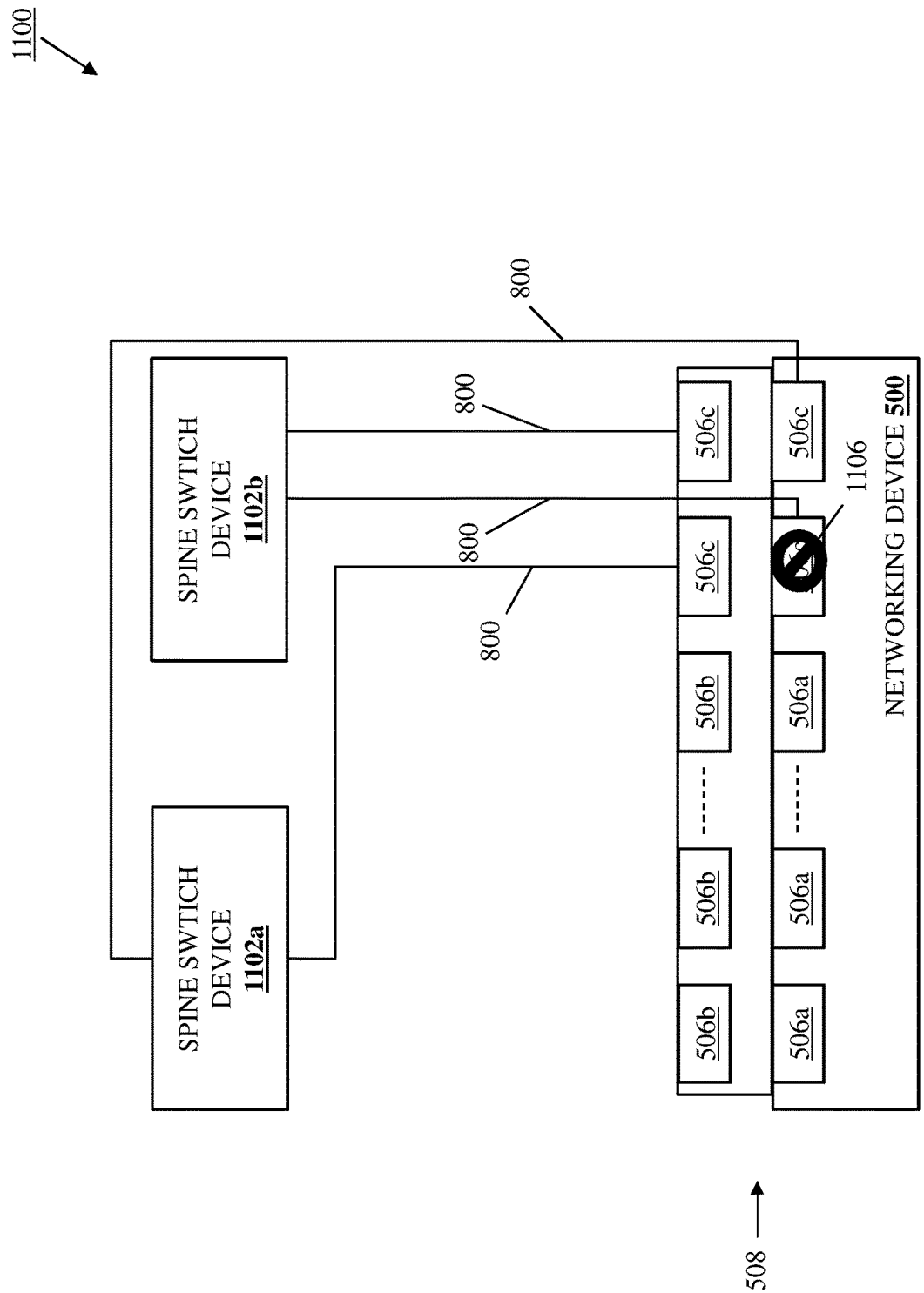
FIG. 11C is a schematic view illustrating an embodiment of the networking device of FIG. 11A operating during the method of FIG. 6.
Figure 11D:
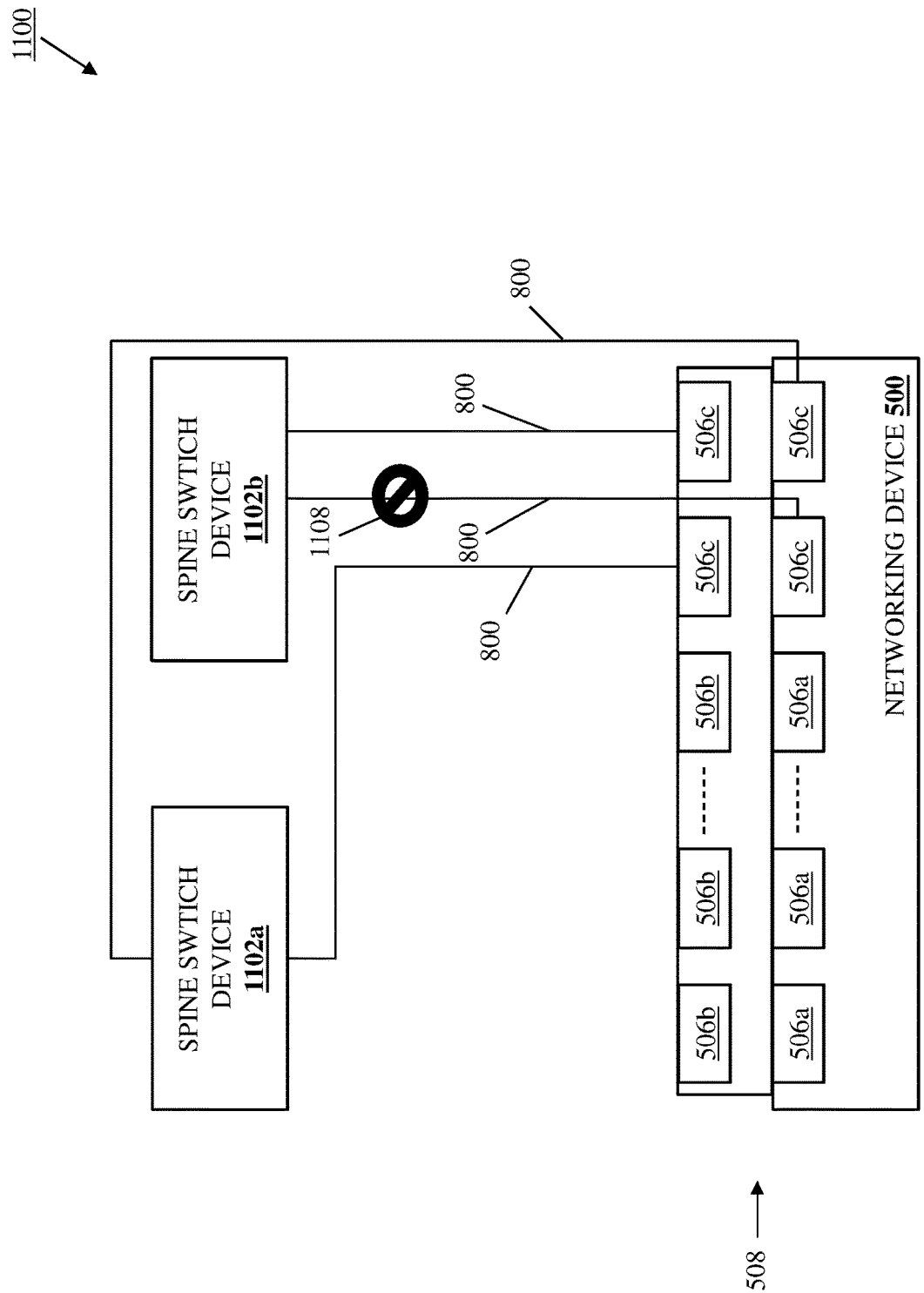
FIG. 11D is a schematic view illustrating an embodiment of the networking device of FIG. 11A operating during the method of FIG. 6.
Figure 11E:
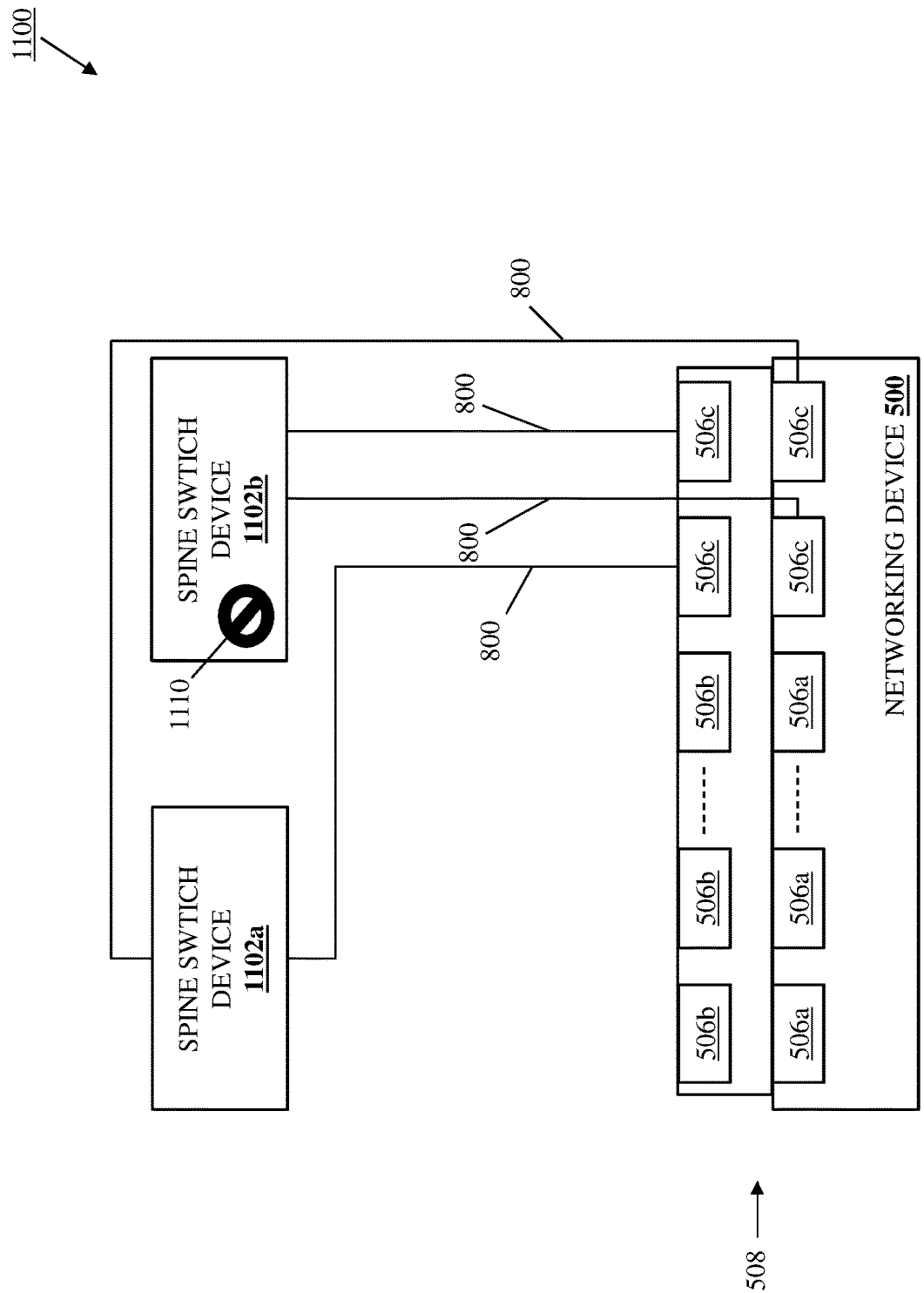
FIG. 11E is a schematic view illustrating an embodiment of the networking device of FIG. 11A operating during the method of FIG. 6.
Figure 11F:
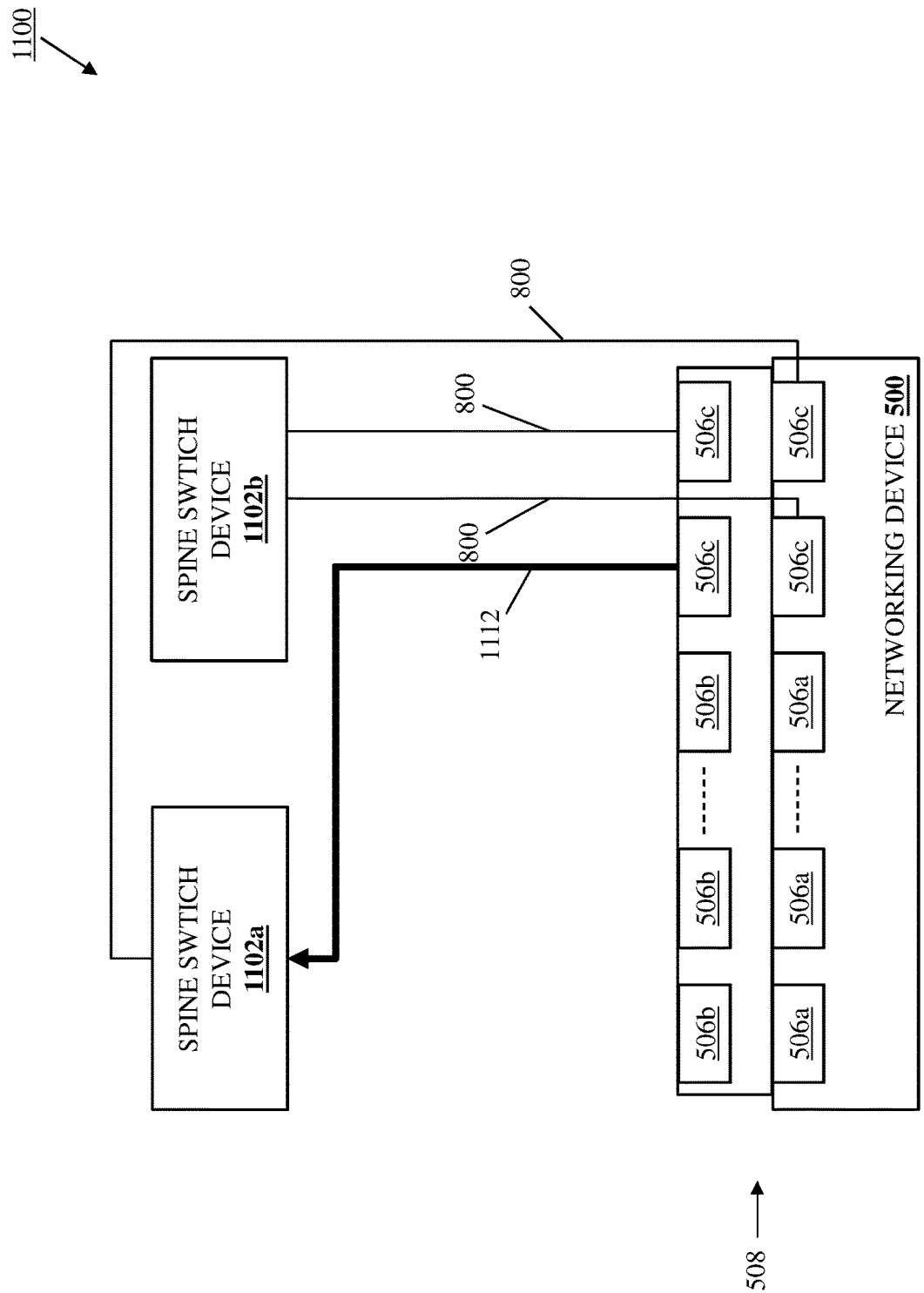
FIG. 11F is a schematic view illustrating an embodiment of the networking device of FIG. 11A operating during the method of FIG. 6.
Figure 11G:
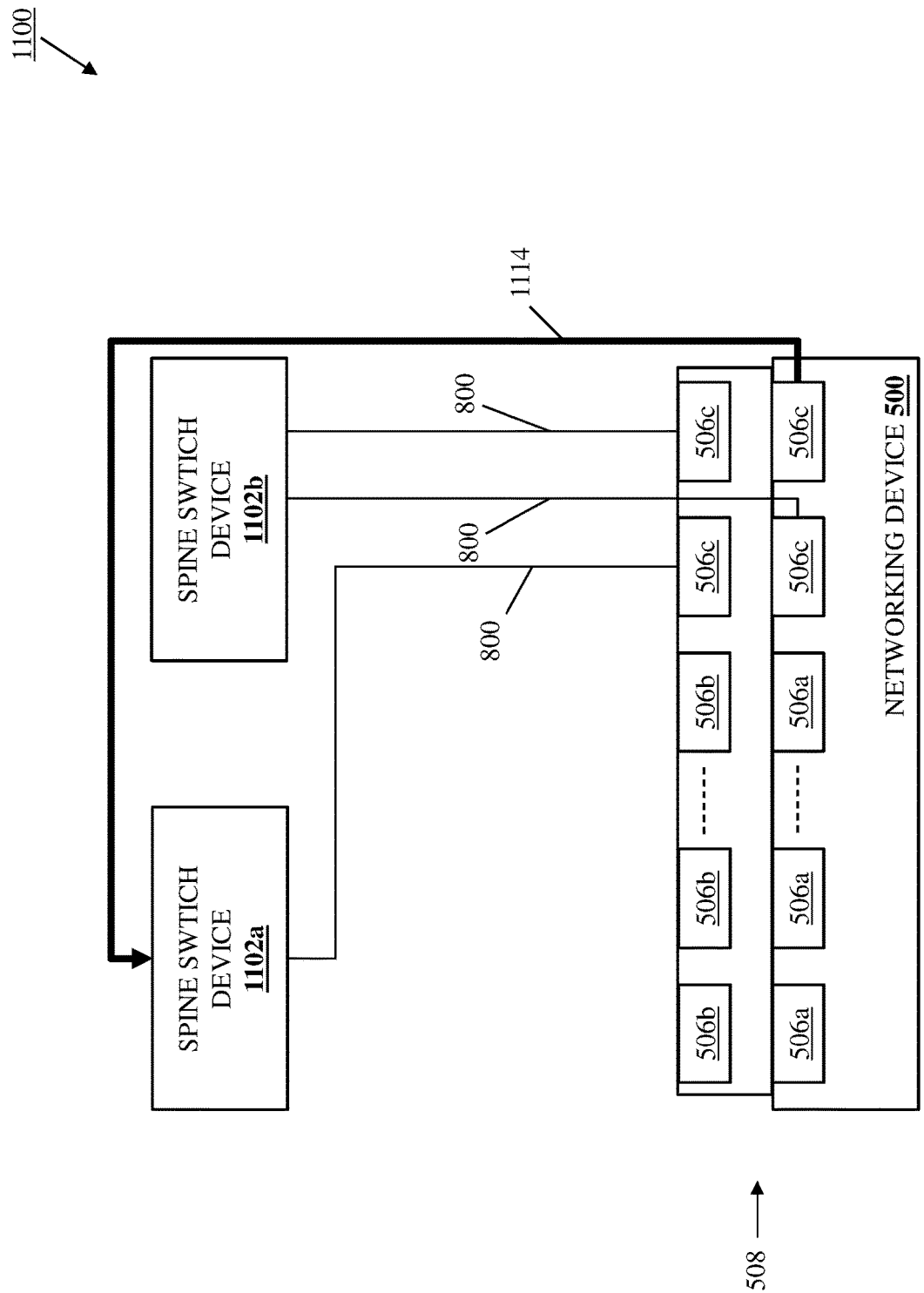
FIG. 11G is a schematic view illustrating an embodiment of the networking device of FIG. 11A operating during the method of FIG. 6.

With reference to FIGS. 11C, 11D, and 11E, in an embodiment of block 608, the switch device 507 may determine that data received from the processing system 504 cannot reach the network via the third port 506c utilized at block 604 (e.g., the third port 506c designated as port "16A" in the examples above) due to a port failure (e.g., as indicated by element 1106 in FIG. 11C), due to a link failure (e.g., as indicated by element 1108 in FIG. 11D), due to a switch unavailability (e.g., as indicated by element 1110 in FIG. 11E), and/or due other network unreachability issues that would be apparent to one of skill in the art in possession of the present disclosure. In response, at block 608 the switch device 507 in the networking device 500 may perform data transmission operations 1112 that include transmitting data received from the processing system 504 in the networking device 504 via a different one of the third ports 406c (e.g., the third port 406c designated as "16B" in the examples above) and to the spine switch device 1102a, as illustrated in FIG. 11F.

As discussed above, the switch device 507 may have "built" connectivity to each of the third ports 506c on the top row 508 of the networking device 500, and thus when data cannot reach the network via the one of the third ports 506c (e.g., the third port 406c designated as "16A" in the examples above) designated as a default port, others of those third ports 506c (e.g., the third port 506c designated as "16B" or "17" in the examples above) may be utilized. As will be appreciated by one of skill in the art in possession of the present disclosure, the second networking configuration 1100 for the networking device 500 provides port-level redundancy, as in the event the spine switch device 1102b become unavailable, the networking device 500 may transmit data to the network via the spine switch device 1102a (i.e., because there is an available spine switch device).

Furthermore, the second networking configuration 1100 for the networking device 500 may provide redundancy benefits when maintenance is performed on one of the spine switch devices 1102a and 1102b (e.g., when the third ports designated as "16A" and "17A" provide connectivity to the spine switch devices 1102b and 1102a, respectively, and the third port designated as "16A" is deactivated while the third port designated as "16B" is activated to provide a redundant connection to the spine switch device 1102a while maintenance is performed on the spine switch device 1102b).

Figure 12C:
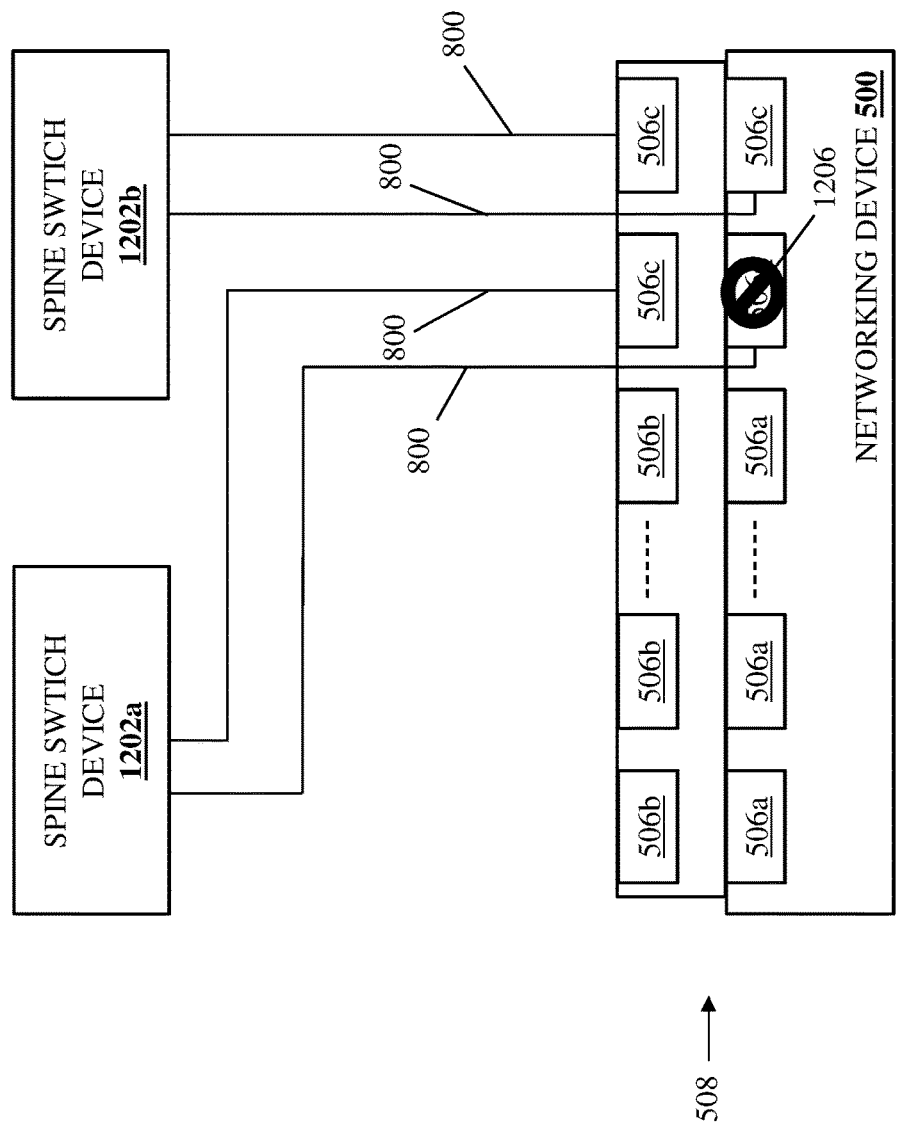
FIG. 12C is a schematic view illustrating an embodiment of the networking device of FIG. 12A operating during the method of FIG. 6.
Figure 12D:
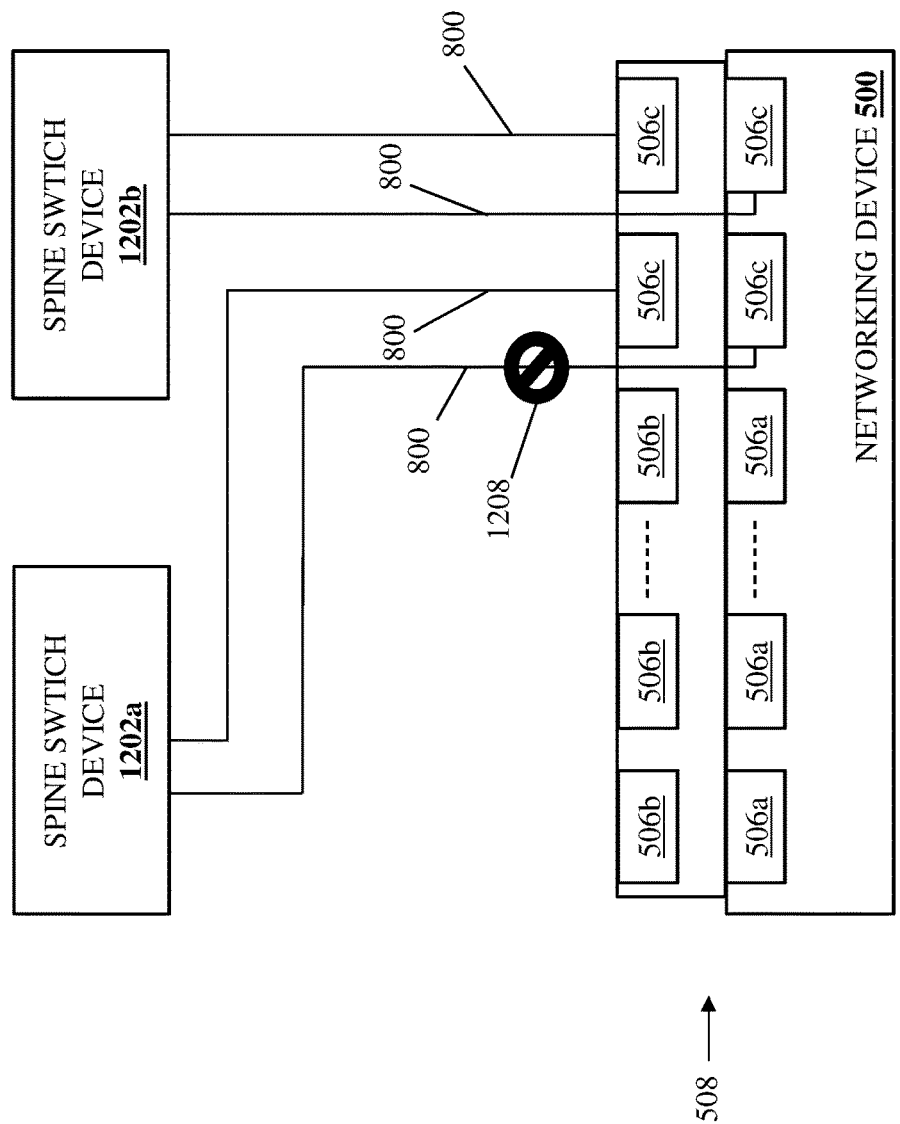
FIG. 12D is a schematic view illustrating an embodiment of the networking device of FIG. 12A operating during the method of FIG. 6.
Figure 12E:
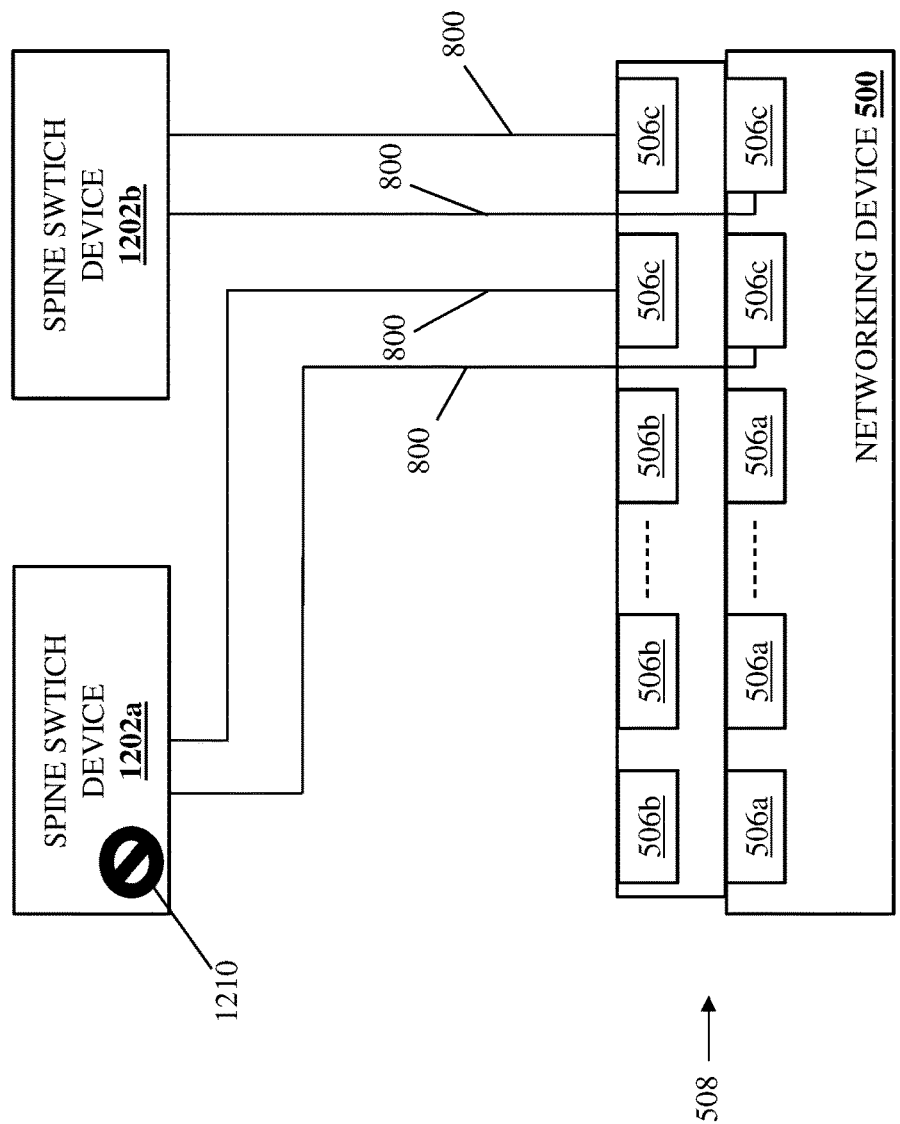
FIG. 12E is a schematic view illustrating an embodiment of the networking device of FIG. 12A operating during the method of FIG. 6.
Figure 12F:
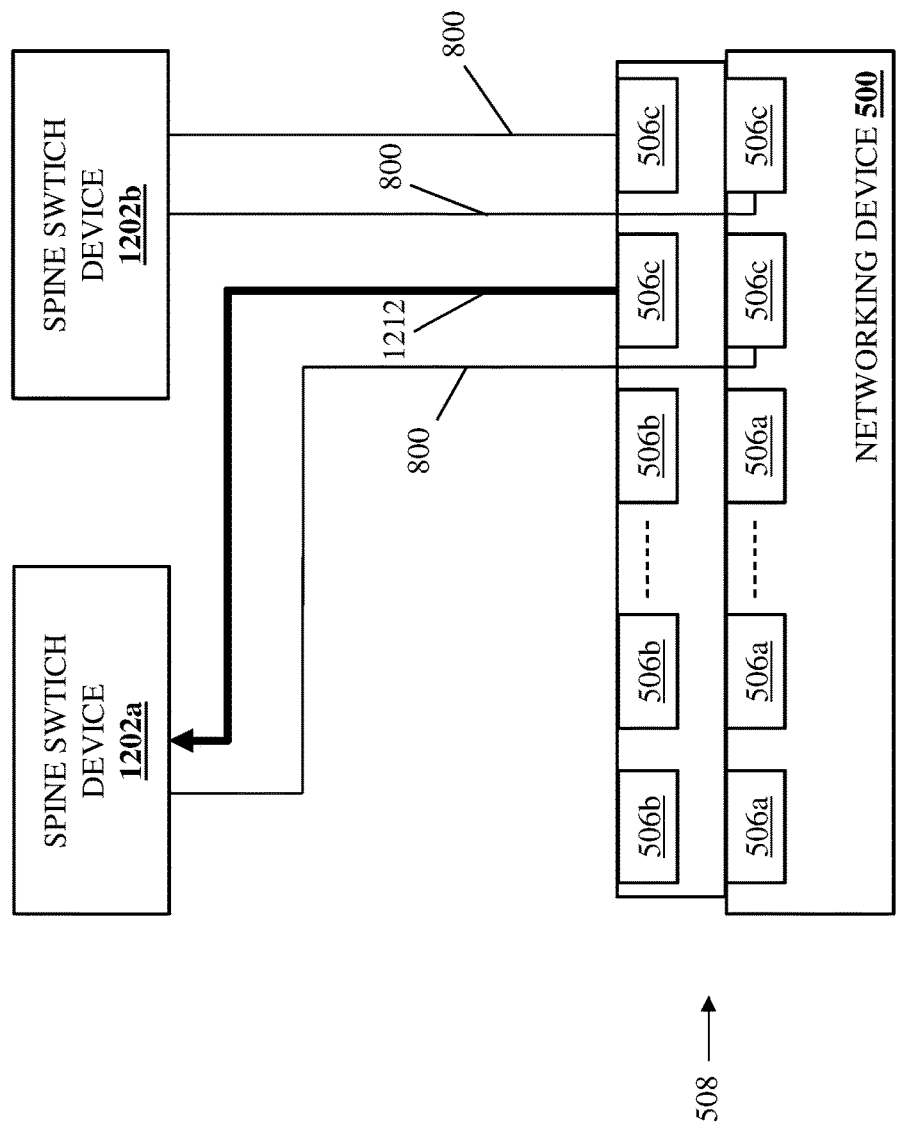
FIG. 12F is a schematic view illustrating an embodiment of the networking device of FIG. 12A operating during the method of FIG. 6.
Figure 12G:
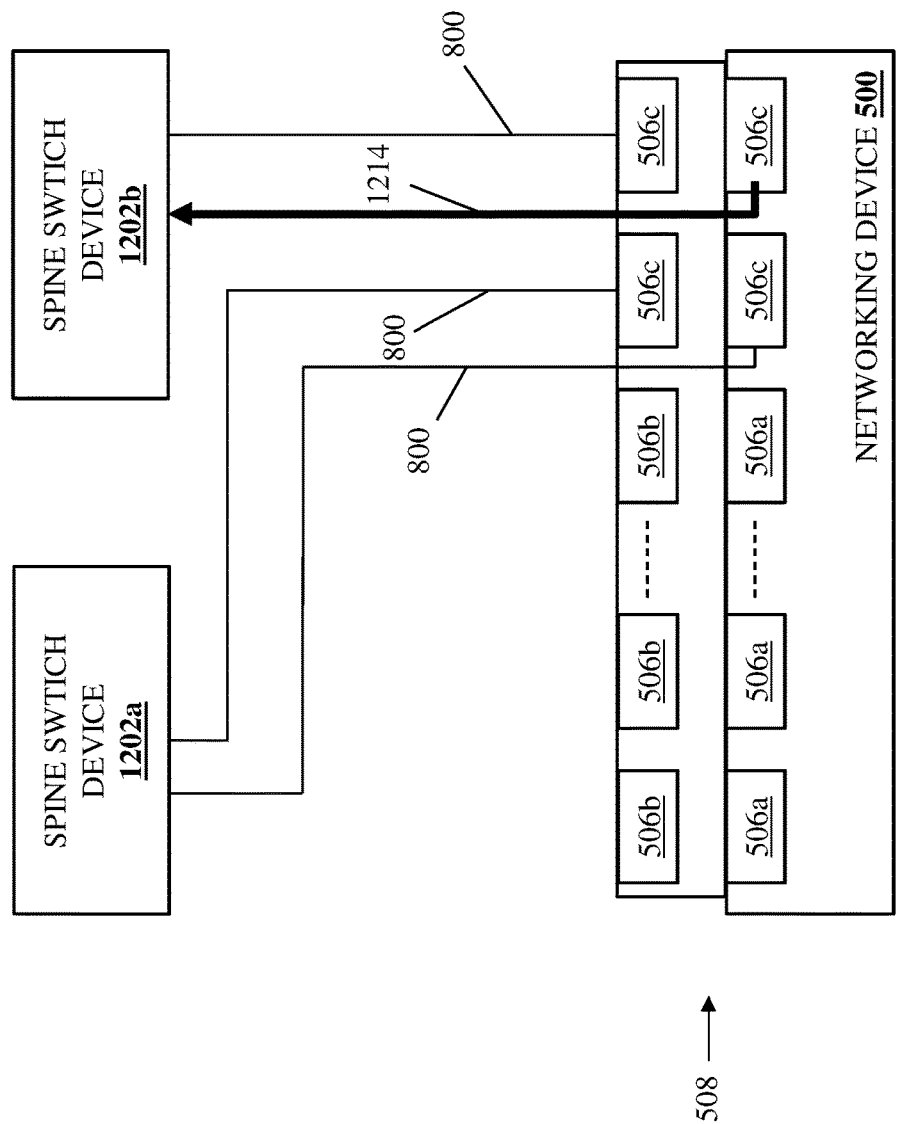
FIG. 12G is a schematic view illustrating an embodiment of the networking device of FIG. 12A operating during the method of FIG. 6.

With reference to FIGS. 12C, 12D, and 12E, in an embodiment of block 608, the switch device 507 may determine that data received from the processing system 504 cannot reach the network via the third port 506c utilized at block 604 (e.g., the third port 506c designated as port "16A" in the examples above) due to a port failure (e.g., as indicated by element 1206 in FIG. 12C), due to a link failure (e.g., as indicated by element 1208 in FIG. 12D), due to a switch unavailability (e.g., as indicated by element 1210 in FIG. 12E), and/or due other network unreachability issues that would be apparent to one of skill in the art in possession of the present disclosure. In response, at block 608 the switch device 507 in the networking device 500 may perform data transmission operations 1212 that include transmitting data received from the processing system 504 in the networking device 504 via a different one of the third ports 406c (e.g., the third port 406c designated as "16B" in the examples above) and to the spine switch device 1202a, as illustrated in FIG. 12F.

As discussed above, the switch device 507 may have "built" connectivity to each of the third ports 506c on the top row 508 of the networking device 500, and thus when data cannot reach the network via the one of the third ports 506c (e.g., the third port 406c designated as "16A" in the examples above) designated as a default port, others of those third ports 506c (e.g., the third port 506c designated as "16B" or "17" in the examples above) may be utilized. As will be appreciated by one of skill in the art in possession of the present disclosure, the second networking configuration 1100 for the networking device 500 provides port-level redundancy, as in the event the spine switch device 1202a become unavailable, the networking device 500 may transmit data to the network via the spine switch device 1202b.

However, while a few specific examples of re-routing data to the network via different third ports 406c/506c in the top row 508 of the networking device 500 have been described, one of skill in the art in possession of the present disclosure will appreciate how data may be re-routed to the network via different third ports 406c/506c in the bottom row 510 of the networking device 500 while remaining within the scope of the present disclosure as well. Furthermore, while the teachings of the present disclosure have been described above as being performed in response to port unavailability, link unavailability, and switch unavailability, other scenarios may benefit from the network data transmission port re-routing described above. For example, one of skill in the art in possession of the present disclosure will appreciate how the switch-level redundancy networking configurations 1000, 1100, and 1200 may allow for "graceful" switchover between spine switch devices, as a user may configure the third ports 406c/506c (e.g., via a Command Line Interface (CLI) access to the networking devices 400/500) to switch network data transmissions from a third port 406c/506c connected to a first spine switch device upon which maintenance is to-be performed, to a third port 406c/506c connected to a second spine switch device that will be available while maintenance is performed, which allows for the performance of maintenance on the first spine switch device without a loss of network data transmission capabilities.

Thus, systems and methods have been described that provide for the operation of the high-density co-packaged optics networking systems of the present disclosure and, in particular, describe embodiments in which redundant uplinks are provided by a pair of fixed/moveable MPO optical ports to ensure connectivity to a network. For example, the high-density networking system of the present disclosure may include spine switch device(s) coupled to a high-density co-packaged optics networking device. The high-density co-packaged optics networking device has an MPO optical port row including first MPO optical ports and a first subset of third MPO optical uplink ports, and second MPO optical ports and a second subset of third MPO optical uplink ports that are each moveable relative to the first MPO optical ports and the first subset of third MPO optical uplink ports, with the third MPO optical uplink ports coupled to the spine switch device(s). The high-density co-packaged optics networking device includes an optical switch coupling the third MPO optical uplink ports to its switch ASIC. The high-density co-packaged optics networking device routes data from the switch ASIC through a network via the first subset of third MPO optical uplink ports/spine switch device(s), determines that data received from the switch ASIC cannot reach the network via the first subset of third MPO optical uplink ports and, in response, routes data received from the switch ASIC through the network via the second subset of third MPO optical uplink ports/spine switch device(s). As such, a high-density co-packaged optics networking system may be provided with a built-in optical switch for MPO optical uplink ports that provides for high availability without the need to utilize a high speed MPO optical non-uplink port in the event of an uplink unavailability, MPO optical uplink port unavailability, a spine switch device unavailability, spine switch device unavailability due to maintenance, and/or other uplink issues know in the art.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A high-density networking system, comprising:
at least one external switch device; and
a networking device that includes:
a port row including:
  a plurality of first ports and a first subset of a plurality of third ports, wherein the first subset of the plurality of third ports are coupled to the at least one external switch device; and
  a plurality of second ports and a second subset of the plurality of third ports that are each moveable relative to the plurality of first ports and the first subset of the plurality of third ports, wherein the second subset of the plurality of third ports are coupled to the at least one external device;
a processing system; and
an internal switch device that couples the plurality of third ports to the processing system, wherein the internal switch device is configured to:
  route first data received from the processing system through a network via the first subset of the plurality of third ports and the at least one external switch device;
  determine that second data received from the processing system cannot reach the network via the first subset of the plurality of third ports; and
  route, in response to determining that the second data received from the processing system cannot reach the network via the first subset of the plurality of third ports, the second data received from the processing system through the network via the second subset of the plurality of third ports and the at least one external switch device.

2. The system of claim 1, wherein the networking device is a co-packaged optics switch system, the processing system is a co-packaged optics switch processor, the internal switch device is an optical switch, and each of the plurality of first ports, the plurality of second ports, and the plurality of third ports are Multi-fiber Push On (MPO) optical ports.

3. The system of claim 1, wherein the determining that the second data received from the processing system cannot reach the network via the first subset of the plurality of third ports includes:
   determining that a link between the first subset of the plurality of third ports and the at least one external switch device is unavailable.

4. The system of claim 1, wherein the determining that the second data received from the processing system cannot reach the network via the first subset of the plurality of third ports includes:
   determining that each at least one external switch device coupled to the first subset of the plurality of third ports is unavailable.

5. The system of claim 1, wherein the determining that the second data received from the processing system cannot reach the network via the first subset of the plurality of third ports includes:
   determining that the first subset of the plurality of third ports are unavailable.

6. The system of claim 1, wherein a first port that is included in the first subset of third ports is coupled to a first external switch device that is included in the at least one external switch device, a second port that is included in the first subset of third ports is coupled to a second external switch device that is included in the at least one external switch device, a first port that is included in the second subset of third ports is coupled to the second external switch device that is included in the at least one external switch device, and a second port that is included in the second subset of third ports is coupled to the first external switch device that is included in the at least one external switch device.

7. An Information Handling System (IHS), comprising:
   a chassis;
   a port row on the chassis including:
      a plurality of first ports and a first subset of a plurality of third ports that are accessible on the chassis, wherein the first subset of the plurality of third ports are coupled to at least one external switch device; and
      a plurality of second ports and a second subset of the plurality of third ports that are accessible on the chassis and that are each moveable relative to the plurality of first ports and the first subset of the plurality of third ports, wherein the second subset of the plurality of third ports are coupled to the at least one external switch device;
   a processing system that is housed in the chassis; and
   an internal switch device that is housed in the chassis and that couples the plurality of third ports to the processing system, wherein the switch device is configured to:
      route first data received from the processing system through a network via the first subset of the plurality of third ports and the at least one external switch device;
      determine that second data received from the processing system cannot reach the network via the first subset of the plurality of third ports; and
      route, in response to determining that the second data received from the processing system cannot reach the network via the first subset of the plurality of third ports, the second data received from the processing system through the network via the second subset of the plurality of third ports and the at least one external switch device.

8. The IHS of claim 7, wherein the IHS is a co-packaged optics switch system, the processing system is a co-packaged optics switch processor, the internal switch device is an optical switch, and each of the plurality of first ports, the plurality of second ports, and the plurality of third ports are Multi-fiber Push On (MPO) optical ports.

9. The IHS of claim 7, wherein the determining that the second data received from the processing system cannot reach the network via the first subset of the plurality of third ports includes:
   determining that a link between the first subset of the plurality of third ports and the at least one external switch device is unavailable.

10. The IHS of claim 7, wherein the determining that the second data received from the processing system cannot reach the network via the first subset of the plurality of third ports includes:
    determining that each at least one external switch device coupled to the first subset of the plurality of third ports is unavailable.

11. The IHS of claim 7, wherein the determining that the second data received from the processing system cannot reach the network via the first subset of the plurality of third ports includes:
    determining that the first subset of the plurality of third ports are unavailable.

12. The IHS of claim 7, wherein a first port that is included in the first subset of third ports is coupled to a first external switch device that is included in the at least one external switch device, a second port that is included in the first subset of third ports is coupled to a second external switch device that is included in the at least one external switch device, a first port that is included in the second subset of third ports is coupled to the second external switch device that is included in the at least one external switch device, and a second port that is included in the second subset of third ports is coupled to the first external switch device that is included in the at least one external switch device.

13. The IHS of claim 7, wherein a first port that is included in the first subset of third ports is coupled to a first external switch device that is included in the at least one external switch device, a second port that is included in the first subset of third ports is coupled to the first external switch device that is included in the at least one external switch device, a first port that is included in the second subset of third ports is coupled to a second external switch device that is included in the at least one external switch device, and a second port that is included in the second subset of third ports is coupled to the second external switch device that is included in the at least one external switch device.

14. A method for operating a high-density networking system, comprising:
    routing, by an internal switch device in a networking device via a first subset of a plurality of third ports that are included in a port row on the networking device with a plurality of first ports, first data received from a processing system in the networking device through a network connected to at least one external switch device that is coupled to the first subset of the plurality of third ports;
    determining, by the internal switch device in the networking device, that second data received from the processing system cannot reach the network via the first subset of the plurality of third ports; and routing, by the internal switch device in the networking device in response to determining that the second data received from the processing system cannot reach the network via the first subset of the plurality of third ports, the second data received from the processing system through the network via a second subset of the plurality of third ports that are included in the port row on the networking device with a plurality of second ports, wherein each of the second ports and the second subset of the plurality of third ports are moveable relative to the plurality of first ports and the first subset of a plurality of third ports.

15. The method of claim 14, wherein the networking device is a co-packaged optics switch system, the processing system is a co-packaged optics switch processor, the internal switch device is an optical switch, and each of the plurality of first ports, the plurality of second ports, and the plurality of third ports are Multi-fiber Push On (MPO) optical ports.

16. The method of claim 14, wherein the determining that the second data received from the processing system cannot reach the network via the first subset of the plurality of third ports includes:

determining that a link between the first subset of the plurality of third ports and the at least one external switch device is unavailable.

17. The method of claim 14, wherein the determining that the second data received from the processing system cannot reach the network via the first subset of the plurality of third ports includes:

determining that each at least one external switch device coupled to the first subset of the plurality of third ports is unavailable.

18. The method of claim 14, wherein the determining that the second data received from the processing system cannot reach the network via the first subset of the plurality of third ports includes:

determining that the first subset of the plurality of third ports are unavailable.

19. The method of claim 14, wherein a first port that is included in the first subset of third ports is coupled to a first external switch device that is included in the at least one external switch device, a second port that is included in the first subset of third ports is coupled to a second external switch device that is included in the at least one external switch device, a first port that is included in the second subset of third ports is coupled to the second external switch device that is included in the at least one external switch device, and a second port that is included in the second subset of third ports is coupled to the first external switch device that is included in the at least one external switch device.

20. The method of claim 14, wherein a first port that is included in the first subset of third ports is coupled to a first external switch device that is included in the at least one external switch device, a second port that is included in the first subset of third ports is coupled to the first external switch device that is included in the at least one external switch device, a first port that is included in the second subset of third ports is coupled to a second external switch device that is included in the at least one external switch device, and a second port that is included in the second subset of third ports is coupled to the second external switch device that is included in the at least one external switch device.

* * * * *